(12) United States Patent
Kohler et al.

(10) Patent No.: US 10,780,770 B2
(45) Date of Patent: Sep. 22, 2020

(54) HYBRID UTILITY VEHICLE

(71) Applicant: Polaris Industries Inc., Medina, MN (US)

(72) Inventors: Beat R. Kohler, Kirchberg (CH); David F. Buehler, Bern (CH); Markus Hoffet, Aarberg (CH); Aaron D. Deckard, Zionsville, IN (US); Stephen L. Nelson, Osceola, WI (US)

(73) Assignee: Polaris Industries Inc., Medina, MN (US)

( * ) Notice: Subject to any disclaimer, the term of this patent is extended or adjusted under 35 U.S.C. 154(b) by 0 days.

(21) Appl. No.: 16/152,719

(22) Filed: Oct. 5, 2018

(65) Prior Publication Data
US 2020/0108709 A1    Apr. 9, 2020

(51) Int. Cl.
| | | |
|---|---|---|
| *B60K 6/40* | (2007.10) | |
| *B60K 6/36* | (2007.10) | |
| *B60K 6/46* | (2007.10) | |
| *B60K 6/48* | (2007.10) | |
| *B60K 6/52* | (2007.10) | |

(52) U.S. Cl.
CPC .................. *B60K 6/40* (2013.01); *B60K 6/36* (2013.01); *B60K 6/46* (2013.01); *B60K 6/48* (2013.01); *B60K 6/52* (2013.01); *B60Y 2200/92* (2013.01)

(58) Field of Classification Search
CPC .................................... B60K 6/48; B60K 6/52
See application file for complete search history.

(56) References Cited

U.S. PATENT DOCUMENTS

| | | |
|---|---|---|
| 1,138,122 A | 5/1915 | Lambert |
| 1,551,594 A | 9/1925 | Walter |
| 1,989,585 A | 1/1935 | Bigelow |
| 2,623,612 A | 12/1952 | Scheiterlein |
| 3,294,190 A | 12/1966 | Tosun |
| 3,523,592 A | 8/1970 | Fenton |
| 3,694,661 A | 9/1972 | Minowa |
| 3,708,028 A | 1/1973 | Hafer |
| 3,874,472 A | 4/1975 | Deane |
| 4,010,725 A | 3/1977 | White |
| 4,022,272 A | 5/1977 | Miller |

(Continued)

FOREIGN PATENT DOCUMENTS

| | | |
|---|---|---|
| AU | 2010260151 | 7/2015 |
| CA | 2972374 | 6/2010 |

(Continued)

OTHER PUBLICATIONS

International Search Report issued by the European Patent Office, dated Jul. 6, 2011, for International Patent Application No. PCT/US2010/049167; 6 pages.

(Continued)

*Primary Examiner* — Brian L Swenson
(74) *Attorney, Agent, or Firm* — Faegre Drinker Biddle & Reath LLP

(57) ABSTRACT

A hybrid vehicle may be a series hybrid or a parallel hybrid vehicle. One embodiment of a parallel hybrid vehicle includes an engine, a transmission coupled to the engine, a front drive coupled to the transmission through a prop shaft, a rear drive coupled to the transmission, a traction motor drivingly coupled to the prop shaft, and a battery to operate the traction motor.

28 Claims, 33 Drawing Sheets

(56) References Cited

U.S. PATENT DOCUMENTS

| | | |
|---|---|---|
| 4,042,054 A | 8/1977 | Ward |
| 4,150,655 A | 4/1979 | Gaggiano |
| 4,254,843 A | 3/1981 | Han |
| 4,337,406 A | 6/1982 | Binder |
| 4,388,583 A | 6/1983 | Krueger |
| 4,404,936 A | 9/1983 | Tatebe |
| 4,405,028 A | 9/1983 | Price |
| 4,405,029 A | 9/1983 | Hunt |
| 4,434,934 A | 3/1984 | Moser |
| 4,470,389 A | 9/1984 | Mitadera |
| 4,602,694 A | 7/1986 | Weldin |
| 4,638,172 A | 1/1987 | Williams |
| 4,685,430 A | 8/1987 | Ap |
| 4,688,529 A | 8/1987 | Mitadera |
| 4,697,660 A | 10/1987 | Wu |
| 4,779,905 A | 10/1988 | Ito |
| 4,898,261 A | 2/1990 | Winberg |
| 5,018,490 A | 5/1991 | Kroner |
| 5,036,939 A | 8/1991 | Johnson |
| 5,148,883 A | 9/1992 | Tanaka |
| 5,212,431 A | 5/1993 | Origuchi |
| 5,251,588 A | 10/1993 | Tsujii |
| 5,251,721 A | 10/1993 | Ortenheim |
| 5,255,733 A | 10/1993 | King |
| 5,264,764 A | 11/1993 | Kuang |
| 5,341,280 A | 8/1994 | Divan |
| 5,359,247 A | 10/1994 | Baldwin |
| 5,382,833 A | 1/1995 | Wirges |
| 5,407,130 A | 4/1995 | Uyeki |
| 5,408,965 A | 4/1995 | Fulton |
| 5,422,822 A | 6/1995 | Toyota |
| 5,461,568 A | 10/1995 | Morita |
| 5,528,148 A | 6/1996 | Rogers |
| 5,546,901 A | 8/1996 | Acker |
| 5,549,153 A | 8/1996 | Baruschke |
| 5,550,445 A | 8/1996 | Nii |
| 5,558,057 A | 9/1996 | Everts |
| 5,586,613 A | 12/1996 | Ehsani |
| 5,614,809 A | 3/1997 | Kiuchi |
| 5,621,304 A | 4/1997 | Kiuchi |
| 5,625,558 A | 4/1997 | Togai |
| 5,647,534 A | 7/1997 | Kelz |
| 5,673,668 A | 10/1997 | Pallett et al. |
| 5,738,062 A | 4/1998 | Everts |
| 5,788,597 A | 8/1998 | Boll |
| 5,804,935 A | 9/1998 | Radev |
| 5,860,403 A | 1/1999 | Hirano |
| 5,867,009 A | 2/1999 | Kiuchi |
| 5,883,496 A | 3/1999 | Esaki |
| 5,947,075 A | 9/1999 | Ryu |
| 5,950,590 A | 9/1999 | Everts |
| 5,960,764 A | 10/1999 | Araki |
| 5,960,901 A | 10/1999 | Hanagan |
| 5,971,290 A | 10/1999 | Echigoya |
| 6,019,183 A | 2/2000 | Shimasaki |
| 6,030,316 A | 2/2000 | Kadota |
| 6,041,877 A | 3/2000 | Yamada |
| 6,047,678 A | 4/2000 | Kurihara |
| 6,114,784 A | 9/2000 | Nakano |
| 6,119,636 A | 9/2000 | Fan |
| 6,152,098 A | 11/2000 | Becker |
| 6,178,947 B1 | 1/2001 | Machida |
| 6,184,603 B1 | 2/2001 | Kyugo |
| 6,196,168 B1 | 3/2001 | Eckerskorn |
| 6,198,183 B1 | 3/2001 | Baeumel |
| 6,209,518 B1 | 4/2001 | Machida |
| 6,213,079 B1 | 4/2001 | Watanabe |
| 6,213,081 B1 | 4/2001 | Ryu |
| 6,216,660 B1 | 4/2001 | Ryu |
| 6,217,758 B1 | 4/2001 | Lee |
| 6,227,160 B1 | 5/2001 | Kurihara |
| 6,276,331 B1 | 8/2001 | Machida |
| 6,332,504 B1 | 12/2001 | Adds |
| 6,333,620 B1 | 12/2001 | Schmitz |
| 6,334,364 B1 | 1/2002 | Suzuki |
| 6,353,786 B1 | 3/2002 | Yamada |
| 6,359,344 B1 | 3/2002 | Klein |
| 6,362,602 B1 | 3/2002 | Kozarekar |
| 6,394,061 B2 | 5/2002 | Ryu |
| 6,397,795 B2 | 6/2002 | Hare |
| 6,427,797 B1 | 8/2002 | Chang |
| 6,488,108 B1 | 12/2002 | Boll |
| 6,504,259 B1 | 1/2003 | Kuroda |
| 6,510,829 B2 | 1/2003 | Ito |
| 6,513,492 B1 | 2/2003 | Bauerle |
| 6,520,133 B1 | 2/2003 | Wenger |
| RE38,012 E | 3/2003 | Ochab |
| 6,528,918 B2 | 3/2003 | Paulus-Neues |
| 6,557,515 B2 | 5/2003 | Furuya |
| 6,561,315 B2 | 5/2003 | Furuya |
| 6,591,896 B1 | 7/2003 | Hansen |
| 6,615,946 B2 | 9/2003 | Pasquini |
| 6,622,804 B2 | 9/2003 | Schmitz |
| 6,640,766 B2 | 11/2003 | Furuya |
| 6,661,108 B1 | 12/2003 | Yamada |
| 6,675,562 B2 | 1/2004 | Lawrence |
| 6,702,052 B1 | 3/2004 | Wakashiro |
| 6,769,391 B1 | 8/2004 | Lee |
| 6,777,846 B2 | 8/2004 | Feldner |
| 6,786,187 B2 | 9/2004 | Nagai |
| 6,809,429 B1 | 10/2004 | Frank |
| 6,810,977 B2 | 11/2004 | Suzuki |
| 6,820,583 B2 | 11/2004 | Maier |
| 6,822,353 B2 | 11/2004 | Koga |
| 6,825,573 B2 | 11/2004 | Suzuki |
| 6,837,325 B2 | 1/2005 | Shimizu |
| 6,886,531 B1 | 5/2005 | Kawakami |
| 6,909,200 B2 | 6/2005 | Bouchon |
| 6,915,770 B2 | 7/2005 | Lu |
| 6,930,405 B2 | 8/2005 | Gunji |
| 6,935,297 B2 | 8/2005 | Honda |
| 6,954,045 B2 | 10/2005 | Nishikawa |
| 6,966,803 B2 | 11/2005 | Hara |
| 7,004,134 B2 | 2/2006 | Higuchi |
| 7,017,542 B2 | 3/2006 | Wilton |
| 7,036,616 B1 | 5/2006 | Kejha |
| 7,055,454 B1 | 6/2006 | Whiting |
| 7,100,562 B2 | 9/2006 | Terada |
| 7,104,242 B2 | 9/2006 | Nishi |
| 7,108,091 B2 | 9/2006 | Guidry |
| 7,114,585 B2 | 10/2006 | Man |
| 7,073,482 B2 | 11/2006 | Kirchberger |
| 7,134,517 B1 | 11/2006 | Kaiser |
| 7,165,522 B2 | 1/2007 | Malek |
| 7,191,855 B2 | 3/2007 | Vasilantone |
| 7,204,219 B2 | 4/2007 | Sakurai |
| 7,208,847 B2 | 4/2007 | Taniguchi |
| 7,216,943 B2 | 5/2007 | Nishikawa |
| 7,224,132 B2 | 5/2007 | Cho |
| 7,243,632 B2 | 7/2007 | Hu |
| 7,258,183 B2 | 8/2007 | Leonardi |
| 7,287,508 B2 | 10/2007 | Kurihara |
| 7,325,526 B2 | 2/2008 | Kawamoto |
| 7,380,621 B2 | 6/2008 | Yoshida |
| 7,389,837 B2 | 6/2008 | Tamai |
| 7,395,804 B2 | 7/2008 | Takemoto |
| 7,412,310 B2 | 8/2008 | Brigham |
| 7,424,926 B2 | 9/2008 | Tsuchiya |
| 7,449,793 B2 | 11/2008 | Cho |
| 7,451,808 B2 | 11/2008 | Busse |
| 7,455,134 B2 | 11/2008 | Severinsky |
| 7,472,766 B2 | 1/2009 | Yamamoto |
| 7,497,285 B1 | 3/2009 | Radev |
| 7,497,286 B2 | 3/2009 | Keller |
| 7,533,754 B2 | 5/2009 | Burrows |
| 7,537,070 B2 | 5/2009 | Maslov |
| 7,560,882 B2 | 7/2009 | Clark |
| 7,641,584 B1 | 1/2010 | Belloso |
| 7,647,994 B1 | 1/2010 | Belloso |
| 7,699,737 B2 | 4/2010 | Berhan |
| 7,715,968 B2 | 5/2010 | Mori |
| 7,740,092 B2 | 6/2010 | Bender |
| 7,747,363 B1 | 6/2010 | Tang |
| 7,762,366 B2 | 7/2010 | Janson |

(56) References Cited

U.S. PATENT DOCUMENTS

| | | |
|---|---|---|
| 7,769,505 B2 | 8/2010 | Rask |
| 7,775,311 B1 | 8/2010 | Hardy |
| 7,780,562 B2 | 8/2010 | King |
| 7,832,513 B2 | 11/2010 | Verbrugge |
| 7,832,514 B2 | 11/2010 | Janson |
| 7,834,582 B2 | 11/2010 | Luan |
| 7,871,348 B2 | 1/2011 | Perkins |
| 7,884,574 B2 | 2/2011 | Fukumura |
| 7,913,782 B1 | 3/2011 | Foss |
| 7,921,945 B2 | 4/2011 | Harris |
| 7,992,662 B2 | 8/2011 | King |
| 7,994,745 B2 | 8/2011 | Fujino |
| 8,007,401 B2 | 8/2011 | Saito |
| 8,011,461 B2 | 9/2011 | Rodriguez |
| 8,033,954 B2 | 10/2011 | Theobald |
| 8,035,247 B2 | 10/2011 | Ichikawa |
| 8,038,573 B2 | 10/2011 | Kozub |
| 8,039,976 B2 | 10/2011 | Sato |
| 8,042,993 B2 | 10/2011 | Van Maanen |
| 8,047,451 B2 | 11/2011 | McNaughton |
| 8,050,851 B2 | 11/2011 | Aoki |
| 8,074,753 B2 | 12/2011 | Tahara |
| 8,075,436 B2 | 12/2011 | Bachmann |
| 8,182,393 B2 | 5/2012 | Gillingham |
| 8,215,427 B2 | 7/2012 | Rouaud |
| 8,256,549 B2 | 9/2012 | Crain |
| 8,269,457 B2 | 9/2012 | Wenger |
| 8,302,724 B2 | 11/2012 | Gillingham |
| 8,323,147 B2 | 12/2012 | Wenger |
| 8,353,265 B2 | 1/2013 | Pursifull |
| 8,356,472 B2 | 1/2013 | Hiranuma |
| 8,386,109 B2 | 2/2013 | Nicholls |
| 8,387,594 B2 | 3/2013 | Wenger |
| 8,449,048 B2 | 5/2013 | Bourqui |
| 8,480,538 B2 | 7/2013 | Gillingham |
| 8,496,079 B2 | 7/2013 | Wenger |
| 8,555,851 B2 | 10/2013 | Wenger |
| 8,567,540 B2 | 10/2013 | Janson |
| 8,567,541 B2 | 10/2013 | Wenger |
| 8,597,145 B2 | 12/2013 | Stuart |
| 8,662,239 B2 | 3/2014 | Takagi |
| 8,701,523 B2 | 4/2014 | Zerbato |
| 8,714,289 B2 | 5/2014 | Olsen |
| 8,783,396 B2 | 7/2014 | Bowman |
| 8,878,469 B2 | 11/2014 | Zerbato |
| 8,936,120 B2 | 1/2015 | Takagi |
| 8,958,965 B2 | 2/2015 | Perkins |
| 8,979,694 B2 * | 3/2015 | Holmes ................. B60W 20/40 475/5 |
| 8,991,283 B2 | 3/2015 | Fuechtner |
| 9,038,754 B2 | 5/2015 | Takagi |
| 9,096,133 B2 | 8/2015 | Kohler |
| 9,108,615 B2 | 8/2015 | Lee |
| 9,126,581 B2 | 9/2015 | Swales |
| 9,162,558 B2 | 10/2015 | Stenberg |
| 9,187,083 B2 | 11/2015 | Wenger |
| 9,216,637 B2 | 12/2015 | Crain |
| 9,598,067 B2 | 3/2017 | Chirnner |
| D786,133 S | 5/2017 | Song |
| 9,643,490 B2 | 5/2017 | Gassmann |
| 9,695,932 B2 | 7/2017 | Lee |
| 9,718,355 B2 | 8/2017 | Osborn |
| 9,738,272 B2 | 8/2017 | West |
| 9,776,625 B2 | 10/2017 | Yukawa |
| 9,802,605 B2 | 10/2017 | Wenger |
| 10,118,477 B2 | 11/2018 | Borud |
| 2001/0011051 A1 | 8/2001 | Hattori |
| 2001/0020554 A1 | 9/2001 | Yanase |
| 2001/0039938 A1 | 11/2001 | Machida |
| 2001/0043808 A1 | 11/2001 | Matsunaga |
| 2002/0011100 A1 | 1/2002 | Pursifull |
| 2002/0074177 A1 | 6/2002 | Pasquini |
| 2002/0094908 A1 | 7/2002 | Urasawa |
| 2002/0104704 A1 | 8/2002 | Chang |
| 2002/0179354 A1 | 12/2002 | White |
| 2003/0034187 A1 | 2/2003 | Hisada |
| 2003/0070849 A1 | 4/2003 | Whittaker |
| 2003/0104900 A1 | 6/2003 | Takahashi |
| 2003/0162631 A1 | 8/2003 | Williams |
| 2004/0002808 A1 | 1/2004 | Hashimoto |
| 2004/0031451 A1 | 2/2004 | Atschreiter |
| 2004/0063535 A1 | 4/2004 | Ibaraki |
| 2004/0079569 A1 | 4/2004 | Awakawa |
| 2004/0130224 A1 | 7/2004 | Mogi |
| 2004/0134698 A1 | 7/2004 | Yamamoto |
| 2004/0159183 A1 | 8/2004 | Sakamoto |
| 2004/0168455 A1 | 9/2004 | Nakamura |
| 2004/0177827 A1 | 9/2004 | Hoyte |
| 2004/0226761 A1 | 11/2004 | Takenaka |
| 2005/0052080 A1 | 3/2005 | Maslov |
| 2005/0055140 A1 | 3/2005 | Brigham |
| 2005/0079953 A1 | 4/2005 | Zieles |
| 2005/0115748 A1 | 6/2005 | Lanier |
| 2005/0279539 A1 | 12/2005 | Chiou |
| 2006/0027618 A1 | 2/2006 | Williams |
| 2006/0066106 A1 | 3/2006 | Yang |
| 2006/0073929 A1 | 4/2006 | Porter |
| 2006/0112695 A1 | 6/2006 | Neubauer |
| 2006/0130888 A1 | 6/2006 | Yamaguchi |
| 2006/0162973 A1 | 7/2006 | Harris |
| 2006/0231304 A1 | 10/2006 | Severinsky |
| 2007/0027609 A1 | 2/2007 | Watanabe |
| 2007/0050095 A1 | 3/2007 | Nelson |
| 2007/0080006 A1 | 4/2007 | Yamaguchi |
| 2007/0114080 A1 | 5/2007 | Kaiser |
| 2007/0114081 A1 | 5/2007 | Iwanaka |
| 2007/0144800 A1 | 6/2007 | Stone |
| 2007/0251742 A1 | 11/2007 | Adams |
| 2007/0259747 A1 | 11/2007 | Thomas |
| 2008/0022981 A1 | 1/2008 | Keyaki |
| 2008/0060866 A1 | 3/2008 | Worman |
| 2008/0083392 A1 | 4/2008 | Kurihara |
| 2008/0121443 A1 | 5/2008 | Clark |
| 2008/0157592 A1 | 7/2008 | Bax |
| 2008/0178830 A1 | 7/2008 | Sposato |
| 2008/0184978 A1 | 8/2008 | Sagawa |
| 2008/0185199 A1 | 8/2008 | Kimura |
| 2008/0202483 A1 | 8/2008 | Procknow |
| 2008/0236920 A1 | 10/2008 | Swindell |
| 2008/0257625 A1 | 10/2008 | Stranges |
| 2008/0271937 A1 | 11/2008 | King |
| 2008/0299448 A1 | 12/2008 | Buck |
| 2008/0308334 A1 | 12/2008 | Leonard |
| 2009/0000849 A1 | 1/2009 | Leonard |
| 2009/0014223 A1 | 1/2009 | Jones |
| 2009/0014246 A1 | 1/2009 | Lin |
| 2009/0015023 A1 | 1/2009 | Fleckner |
| 2009/0064642 A1 | 3/2009 | Sato |
| 2009/0065279 A1 | 3/2009 | Bessho |
| 2009/0071737 A1 | 3/2009 | Leonard |
| 2009/0071739 A1 | 3/2009 | Leonard |
| 2009/0079384 A1 | 3/2009 | Harris |
| 2009/0090573 A1 | 4/2009 | Boone |
| 2009/0091101 A1 | 4/2009 | Leonard |
| 2009/0091137 A1 | 4/2009 | Nishida |
| 2009/0121518 A1 | 5/2009 | Leonard |
| 2009/0143929 A1 | 6/2009 | Eberhard |
| 2009/0177345 A1 | 7/2009 | Severinsky |
| 2009/0179509 A1 | 7/2009 | Gerundt |
| 2009/0183938 A1 | 7/2009 | Cover |
| 2009/0256415 A1 | 10/2009 | Bourqui |
| 2009/0301830 A1 | 12/2009 | Kinsman |
| 2009/0302590 A1 | 12/2009 | Van Bronkhorst |
| 2009/0314462 A1 | 12/2009 | Yahia |
| 2009/0321156 A1 | 12/2009 | Perkins |
| 2010/0012412 A1 | 1/2010 | Deckard |
| 2010/0019722 A1 | 1/2010 | Sanchez |
| 2010/0060015 A1 | 3/2010 | Buker |
| 2010/0065344 A1 | 3/2010 | Collings, III |
| 2010/0090657 A1 | 4/2010 | Fazakas |
| 2010/0090797 A1 | 4/2010 | Koenig |
| 2010/0096199 A1 | 4/2010 | Raynor |
| 2010/0121512 A1 | 5/2010 | Takahashi |
| 2010/0131134 A1 | 5/2010 | Wallace |

(56) References Cited

U.S. PATENT DOCUMENTS

| | | | |
|---|---|---|---|
| 2010/0147606 A1 | 6/2010 | Kalenbom |
| 2010/0155170 A1 | 6/2010 | Melvin |
| 2010/0162989 A1 | 7/2010 | Aamand |
| 2010/0211242 A1 | 8/2010 | Kelty |
| 2010/0314182 A1 | 12/2010 | Crain |
| 2010/0314183 A1 | 12/2010 | Olsen |
| 2010/0314184 A1 | 12/2010 | Stenberg |
| 2010/0317484 A1 | 12/2010 | Gillingham |
| 2010/0317485 A1 | 12/2010 | Gillingham |
| 2010/0320959 A1 | 12/2010 | Tomberlin |
| 2011/0036658 A1 | 2/2011 | Cantemir |
| 2011/0048821 A1 | 3/2011 | Dial |
| 2011/0061961 A1 | 3/2011 | Liu |
| 2011/0094225 A1 | 4/2011 | Kistner |
| 2011/0139521 A1 | 6/2011 | Ichikawa |
| 2011/0147106 A1 | 6/2011 | Wenger |
| 2011/0148184 A1 | 6/2011 | Suzuki |
| 2011/0174561 A1 | 7/2011 | Bowman |
| 2011/0226539 A1 | 9/2011 | Huss |
| 2012/0125022 A1 | 5/2012 | Maybury |
| 2012/0209463 A1 | 8/2012 | Gibbs |
| 2013/0006458 A1 | 1/2013 | Bhattarai |
| 2013/0060410 A1 | 3/2013 | Crain |
| 2013/0075183 A1 | 3/2013 | Kochidomari |
| 2014/0144719 A1 | 5/2014 | Morgan |
| 2016/0207418 A1 | 7/2016 | Bergstrom |
| 2018/0264928 A1* | 9/2018 | Takaki ............... B60K 6/40 |

FOREIGN PATENT DOCUMENTS

| | | |
|---|---|---|
| CA | 2773214 | 9/2010 |
| CA | 2764399 | 8/2017 |
| CN | 1268997 | 10/2000 |
| CN | 201211849 | 3/2009 |
| CN | 101701547 | 5/2010 |
| CN | 101708694 | 5/2010 |
| CN | 105517670 | 4/2016 |
| CN | 106314118 | 1/2017 |
| CN | 107207055 | 9/2017 |
| DE | 3825349 | 2/1989 |
| DE | 4427322 | 2/1996 |
| DE | 4447138 | 12/1997 |
| DE | 19735021 | 2/1999 |
| DE | 102005003077 | 8/2006 |
| DE | 102007024126 | 12/2008 |
| DE | 10211102265 | 4/2012 |
| EP | 0511654 | 11/1992 |
| EP | 0856427 | 8/1998 |
| EP | 0898352 | 2/1999 |
| EP | 1205331 | 5/2002 |
| EP | 1382475 | 1/2004 |
| EP | 2145808 | 1/2010 |
| EP | 3403862 | 9/2010 |
| EP | 2266855 | 12/2010 |
| EP | 2567846 | 3/2013 |
| EP | 2792523 | 10/2014 |
| FR | 2941424 | 7/2010 |
| FR | 3041909 | 4/2017 |
| FR | 3058696 | 5/2018 |
| GB | 2349483 | 11/2000 |
| GB | 2431704 | 5/2007 |
| GB | 2452062 | 2/2009 |
| GB | 2454349 | 5/2009 |
| JP | 58126434 | 7/1983 |
| JP | 59039933 | 3/1984 |
| JP | 60209616 | 10/1985 |
| JP | 61135910 | 6/1986 |
| JP | 2005130629 | 5/2005 |
| JP | 2005299469 | 10/2005 |
| JP | 2007064080 | 3/2007 |
| JP | 2007278228 | 10/2007 |
| JP | 2009173147 | 8/2009 |
| JP | 2009220765 | 10/2009 |
| JP | 2009281330 | 12/2009 |
| JP | 2010064744 | 3/2010 |
| JP | 2015085765 | 5/2015 |
| KR | 20080028174 | 3/2008 |
| WO | WO 2004/067361 | 8/2004 |
| WO | WO 2004/085194 | 10/2004 |
| WO | WO 2008/115463 | 9/2008 |
| WO | WO 2009/059407 | 5/2009 |
| WO | WO 2010/081979 | 7/2010 |
| WO | WO 2010/015784 | 11/2010 |
| WO | WO 2010/148016 | 12/2010 |
| WO | WO 2011/035056 | 3/2011 |
| WO | WO 2012/138991 | 10/2012 |
| WO | WO 2016/118585 | 7/2016 |
| WO | WO 2017/218225 | 12/2017 |

OTHER PUBLICATIONS

Written Opinion issued by the European Patent Office, dated Jul. 6, 2011, for International Patent Application No. PCT/US2010/049167; 5 pages.

Letter Exam Report issued by the State Intellectual Property Office (SEPO), dated Mar. 18, 2015, for Chinese Patent Application No. 201080046628.5; 20 pages.

*Research on Generator Set Control of Ranger Extender Pure Electric Vehicles*, Fang, et al., Power and Energy Conference (APPEEC), 2010 Asia-Pacific, Mar. 31, 2010; 4 pages.

*Range extender hybrid vehicle*, Heitner, Intersociety Energy Conversion Engineering Conference Proceedings, vol. 4. pp. 323-338; 1991; 7 pages.

International Preliminary Report on Patentability issued by The International Bureau of WIPO, dated Mar. 4, 2014, for International Patent Application No. PCT/US2012/032510; 5 pages.

International Search Report issued by the European Patent Office, dated Feb. 21, 2014, for International Patent Application No. PCT/US2012/032510; 5 pages.

Written Opinion issued by the European Patent Office, dated Feb. 21, 2014, for International Patent Application No. PCT/US2012/032510; 4 pages.

International Search Report issued by the European Patent Office, dated Apr. 6, 2011, for International Patent Application No. PCT/US2010/038711; 6 pages.

Written Opinion issued by the European Patent Office, dated Apr. 6, 2011, for International Patent Application No. PCT/US2010/038711; 8 pages.

Photograph of Bad Boy buggies® All Electric 4WD vehicle, undated; 1 page.

International Search Report and Written Opinion of the International Searching Authority, dated Sep. 14, 2017, for International Patent Application No. PCT/US2017/035939; 10 pages.

Photograph of Ruff & Tuff vehicle, undated; 1 page.

"Bad Boy Partners with G-Force on Project", All-Terrain Vehicles Magazine, Jan. 29, 2009, available at http://www.atvmag.com/article.asp?nid=1324, accessed on Jun. 11, 2010; 2 pages/

"Bear DC Contractor Specifications", Trombetta Tympanium, 2003, available at www.trombetta.com; 2 pages.

International Search Report and Written Opinion issued by the International Searching Authority, dated Jan. 24, 2020, for International Patent Application No. PCT/US2019/054510; 16 pages.

* cited by examiner

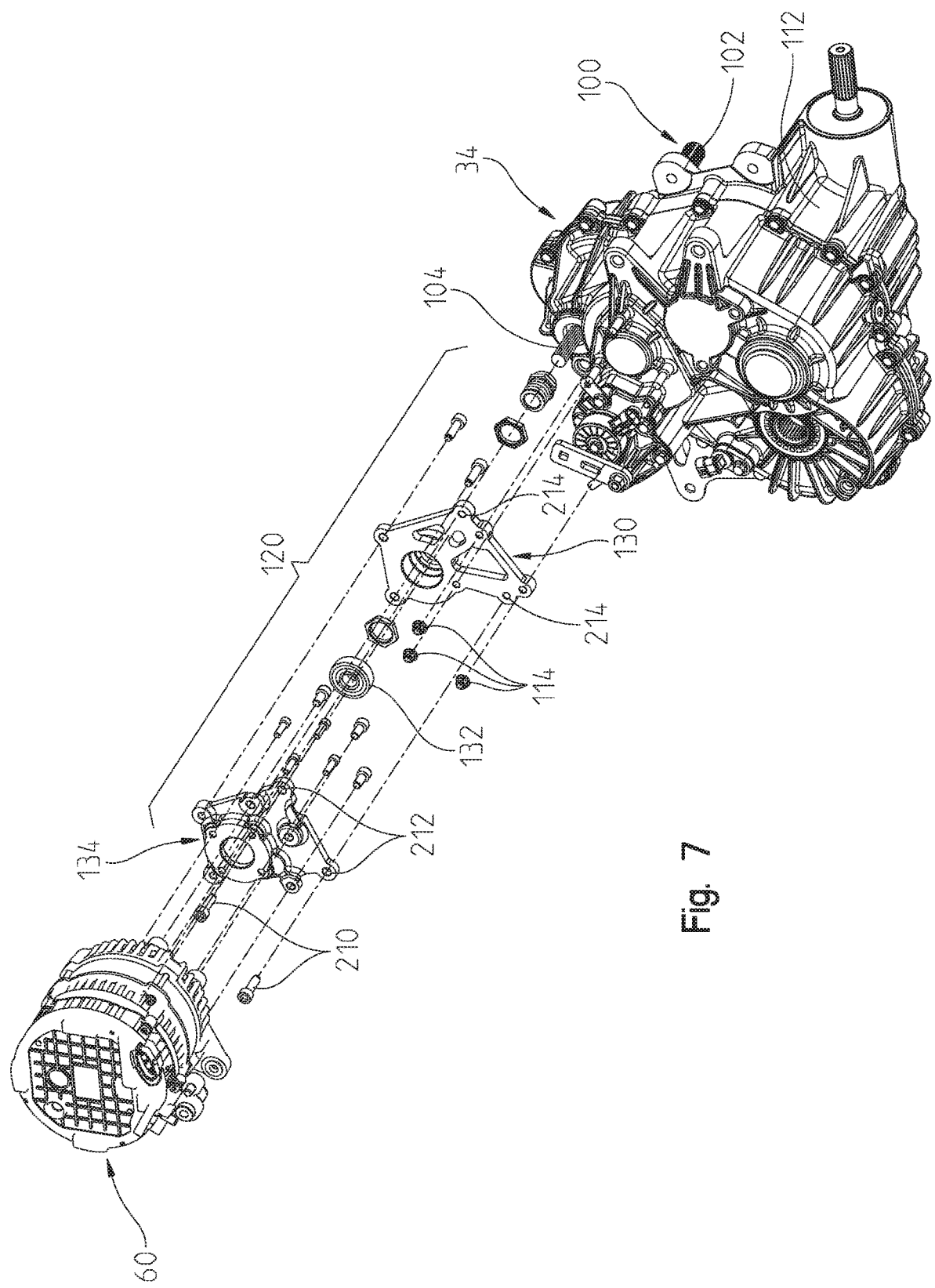

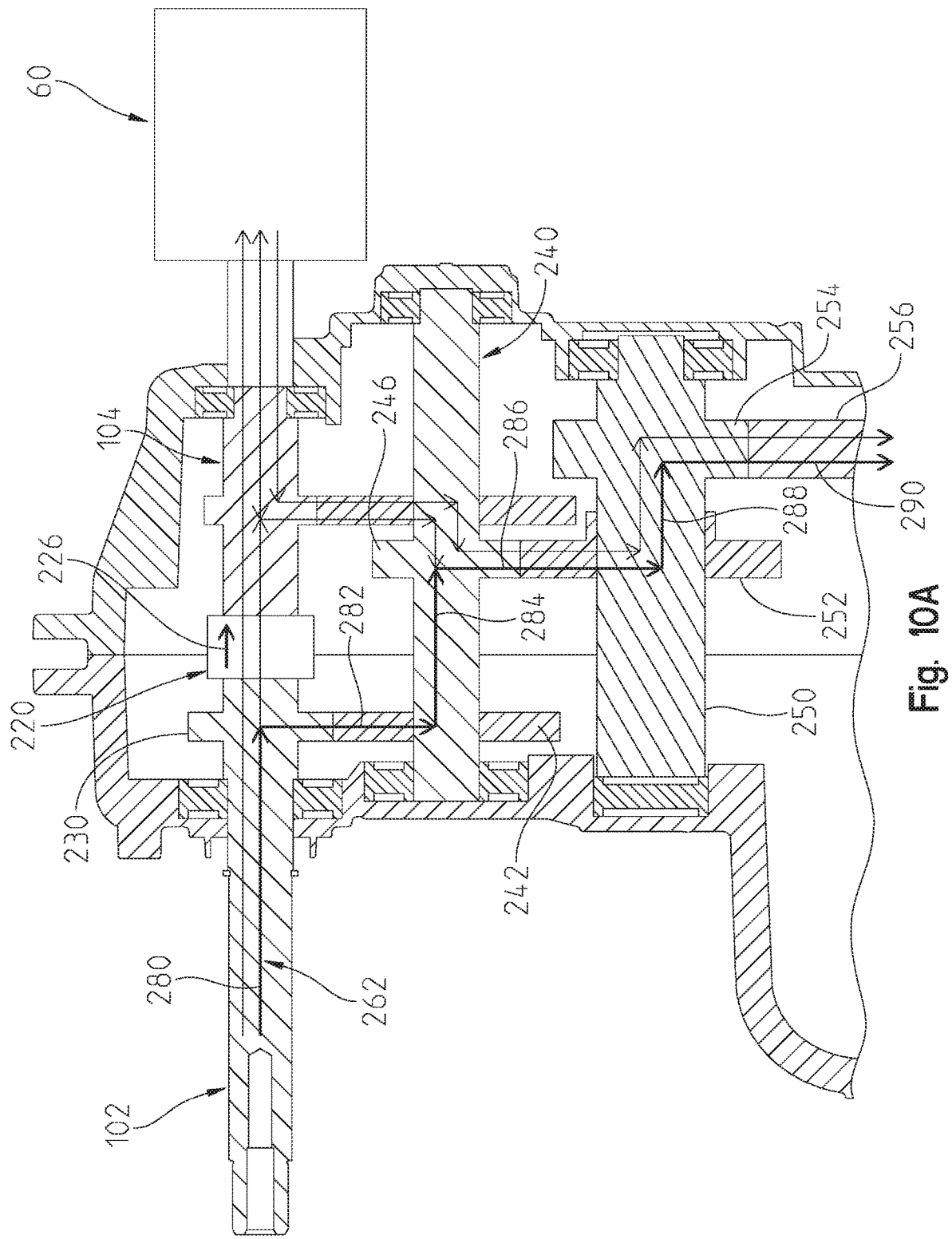

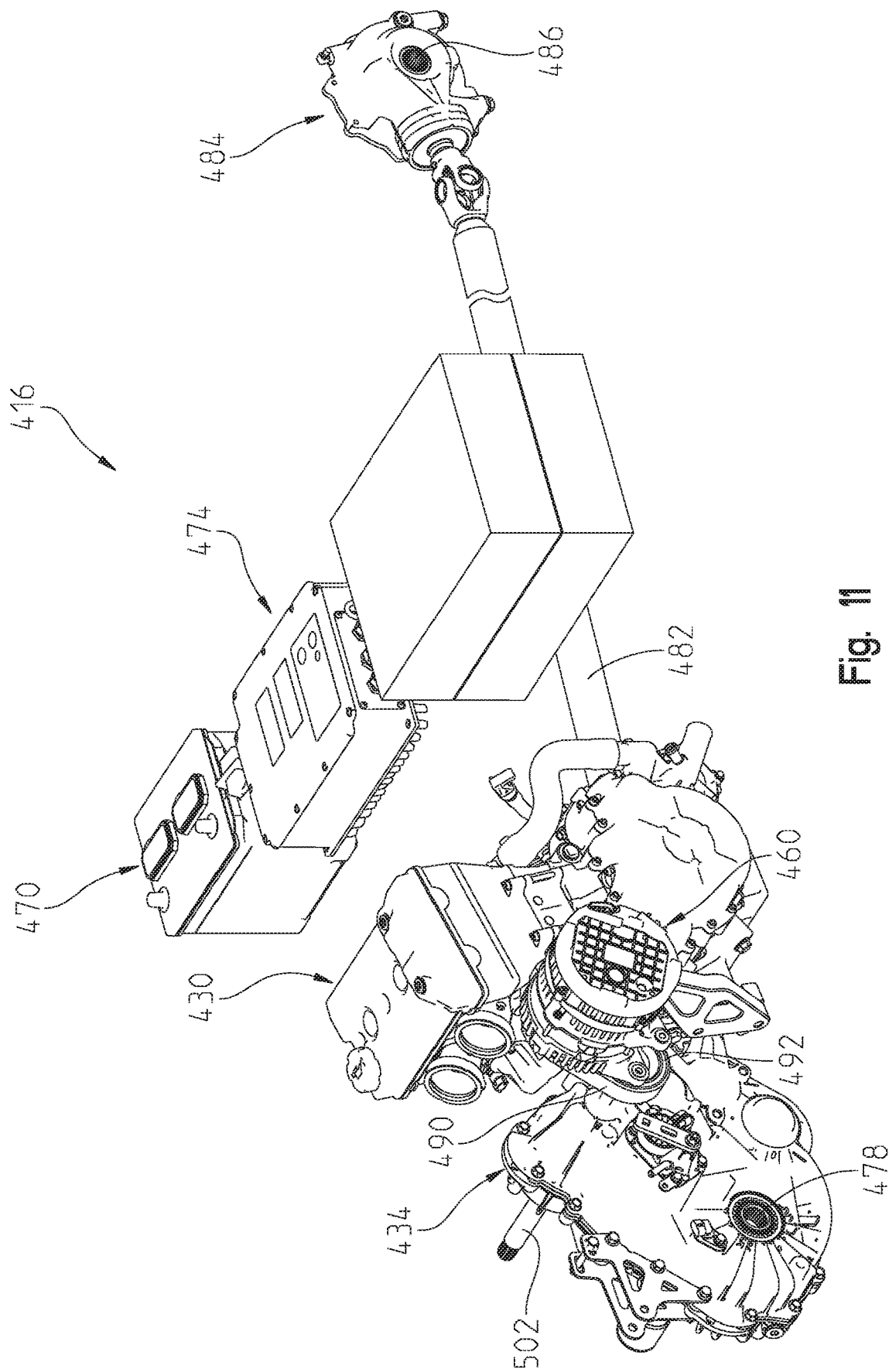

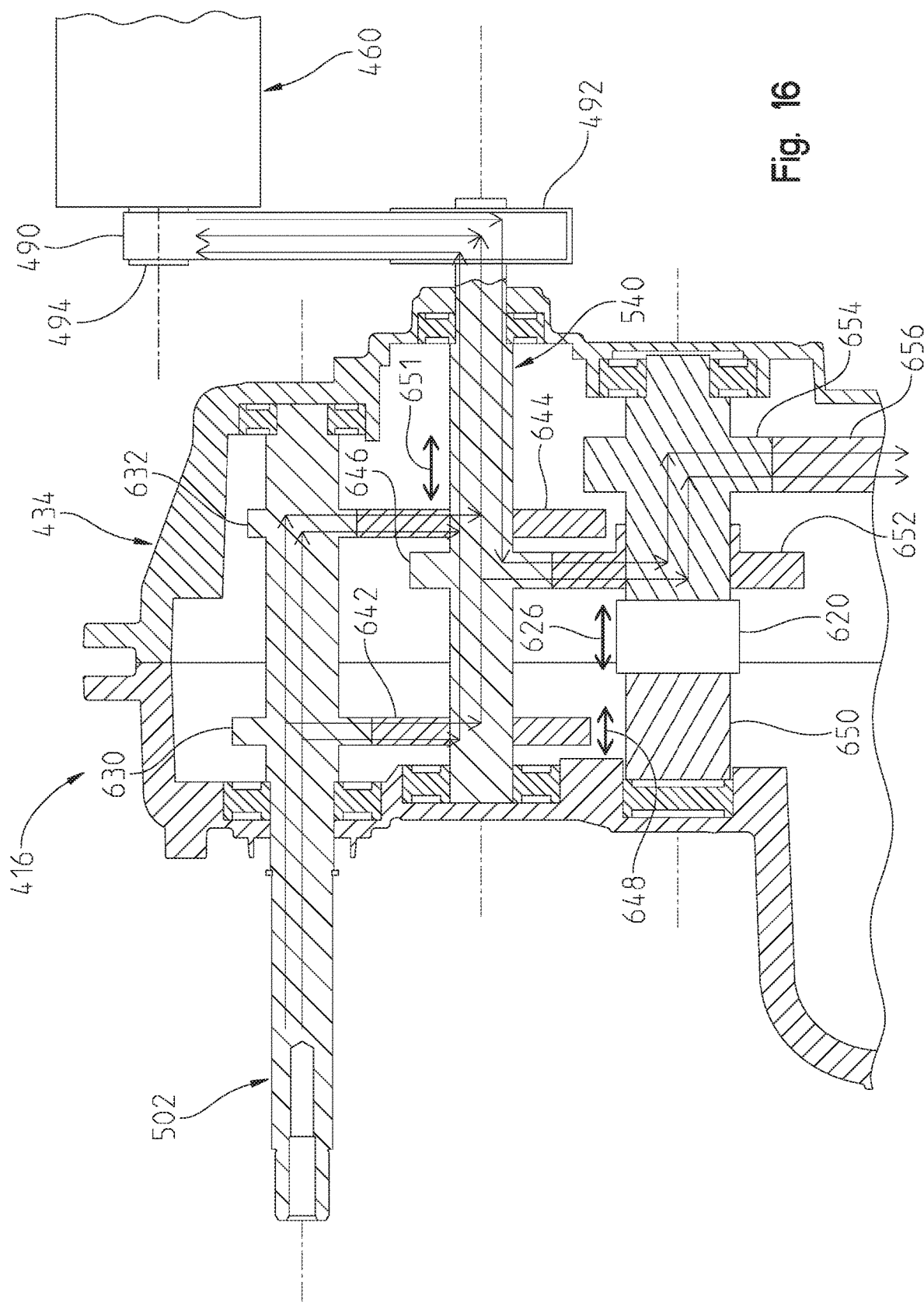

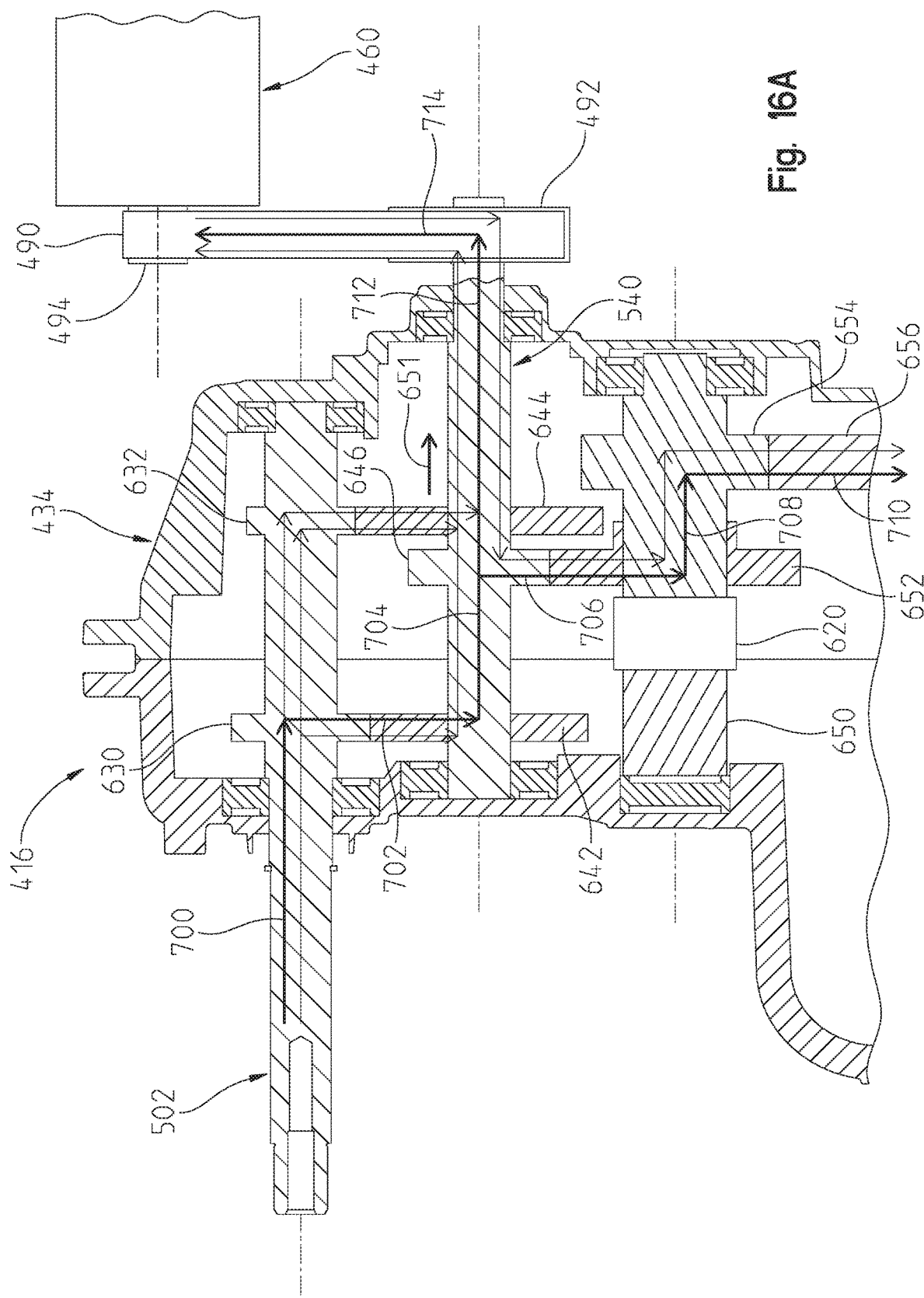

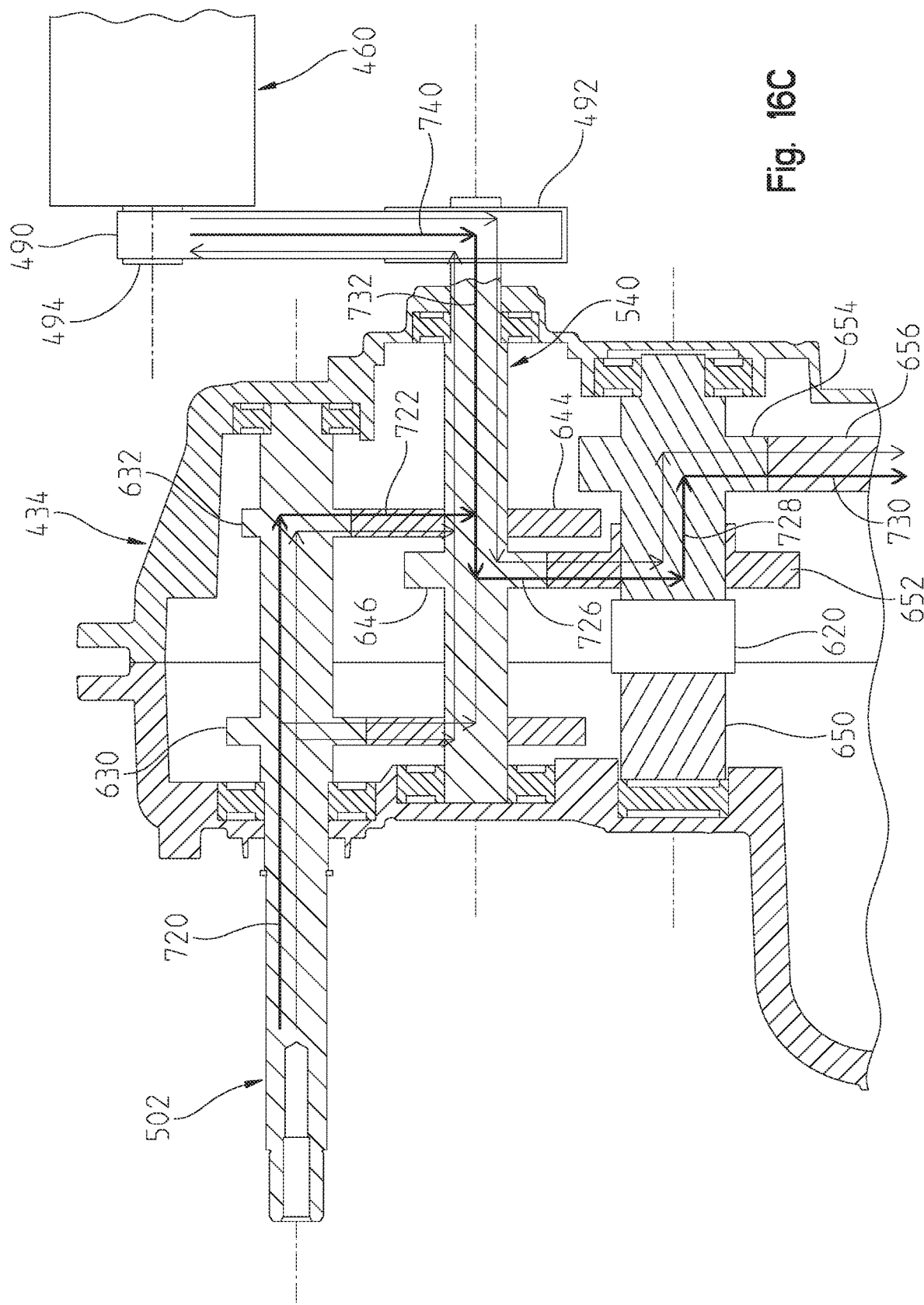

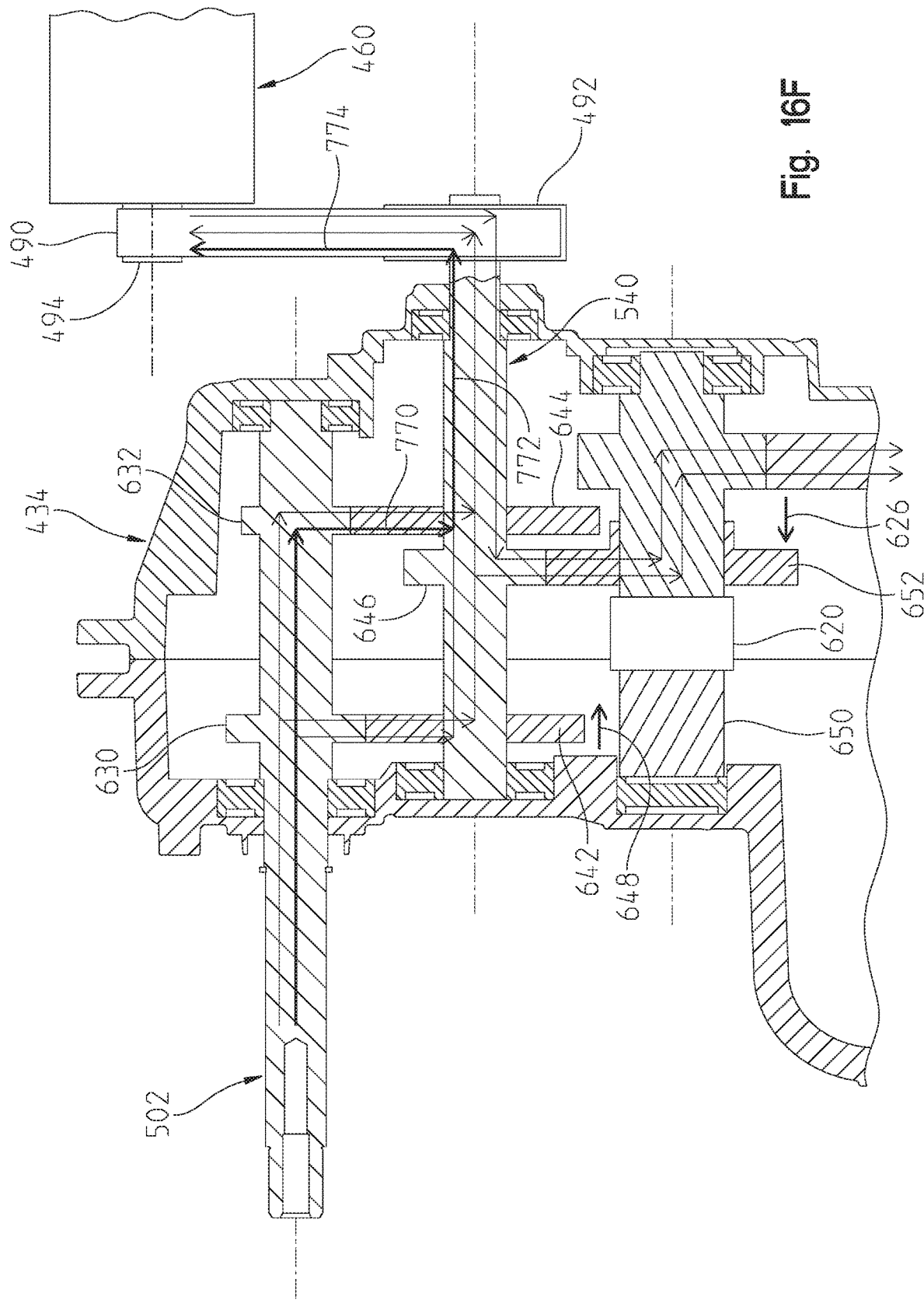

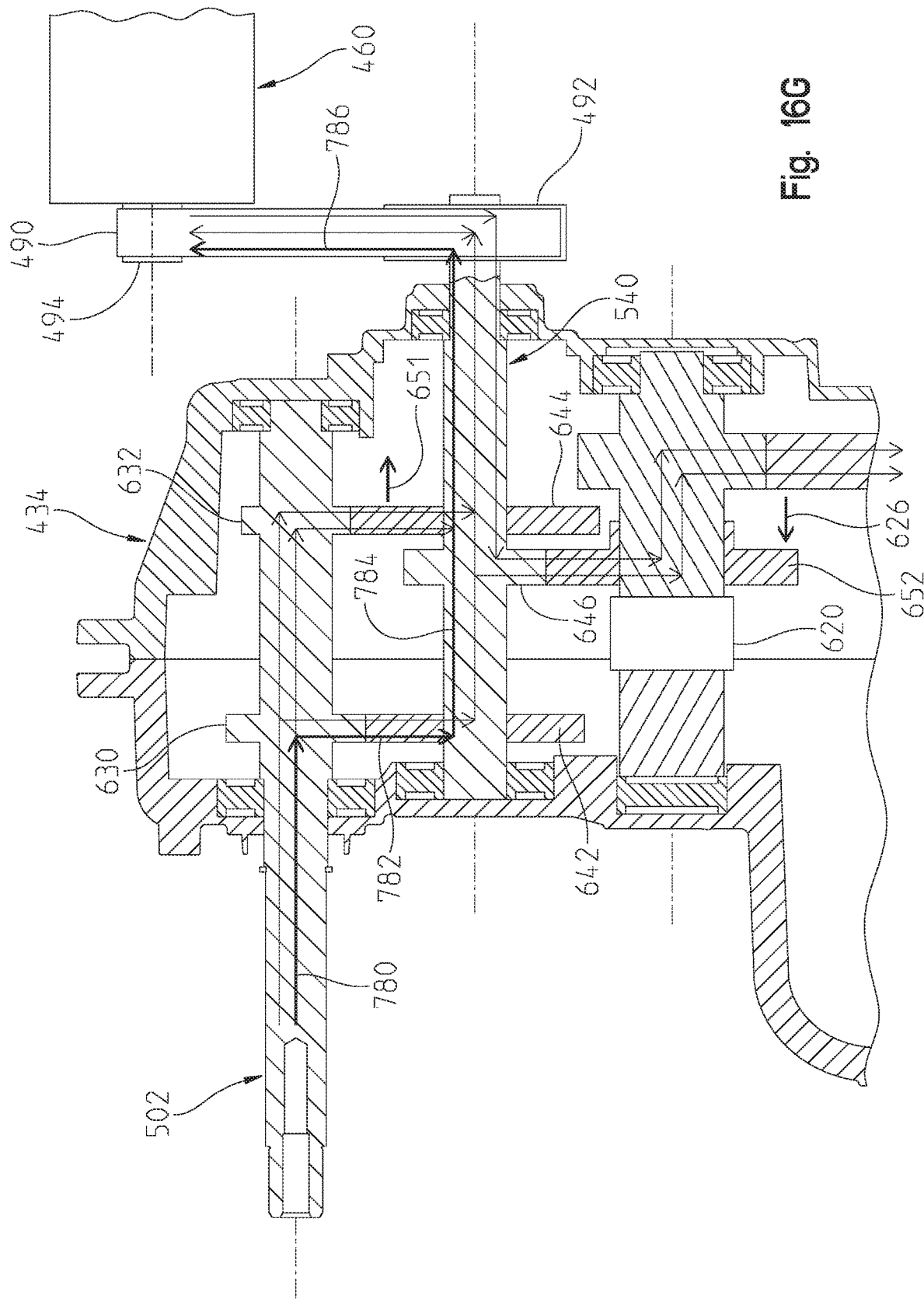

HYBRID UTILITY VEHICLE

FIELD OF THE DISCLOSURE

The present application relates to a utility vehicle and, more particularly, a hybrid utility vehicle configured to operate in various drive modes.

BACKGROUND OF THE DISCLOSURE

Electric vehicles are known to have at least one battery pack which may be operably coupled to an electric motor for charging the battery pack and/or for driving the wheels of the vehicle. A hybrid vehicle, however, has both an electric motor and an internal combustion engine. In one embodiment of a hybrid vehicle, the engine and the battery packs operate in series, meaning that the battery packs provide the power or energy for driving the wheels and the engine operates to charge the battery packs. Alternatively, in another embodiment, a hybrid vehicle may be a parallel hybrid vehicle, meaning that the battery packs provide the power or energy to drive either the front or rear wheels but the engine provides the motive power to drive the other set of wheels.

SUMMARY OF THE DISCLOSURE

In one embodiment, a parallel hybrid power train comprises an engine, an electric motor/generator, a transmission having an input shaft, at least a second shaft drivingly coupled to the input shaft, the engine and the electric motor/generator being coupled to one of the input or second shafts, and at least a first output; and a final drive assembly operably coupled to the first output, the final drive assembly being profiled for driving ground engaging members of a vehicle.

The parallel hybrid power train may comprise a silent mode wherein the electric motor/generator operates to drive the transmission output. The parallel hybrid power train may also allow the engine driven generator to charge the battery. In this embodiment, the parallel hybrid power train comprises a charge at rest mode wherein the engine is run to only charge the batteries through the engine driven motor/generator.

The parallel hybrid power train may also comprise a full performance mode wherein the motor/generator and engine are both operated to add torque to the transmission output.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where:

FIG. 7 is an exploded view of a portion of the power train with the motor/generator exploded away from the transmission;

FIG. 10A is a view similar to that of FIG. 10, showing the drive mode with the engine drive only in high gear;

FIG. 11 is a rear right perspective view of a second embodiment of a powertrain assembly of the series hybrid utility vehicle of the present disclosure;

FIG. 16 is a cross-sectional view through lines 16-16 of FIG. 13 illustrating the power flow between various components of the hybrid utility vehicle of FIG. 11 in various drive modes;

FIG. 16A is a view similar to that of FIG. 16, showing a "Charge-and-Drive" drive mode in high gear;

FIG. 16C is a view similar to that of FIG. 16, showing a full performance drive mode with the engine and motor drive in low gear;

FIG. 16F is a view similar to that of FIG. 16, showing a "Charge-at-Rest" drive mode in low gear;

FIG. 16G is a view similar to that of FIG. 16, showing a "Charge-at-Rest" drive mode in high gear;

Figure 1:
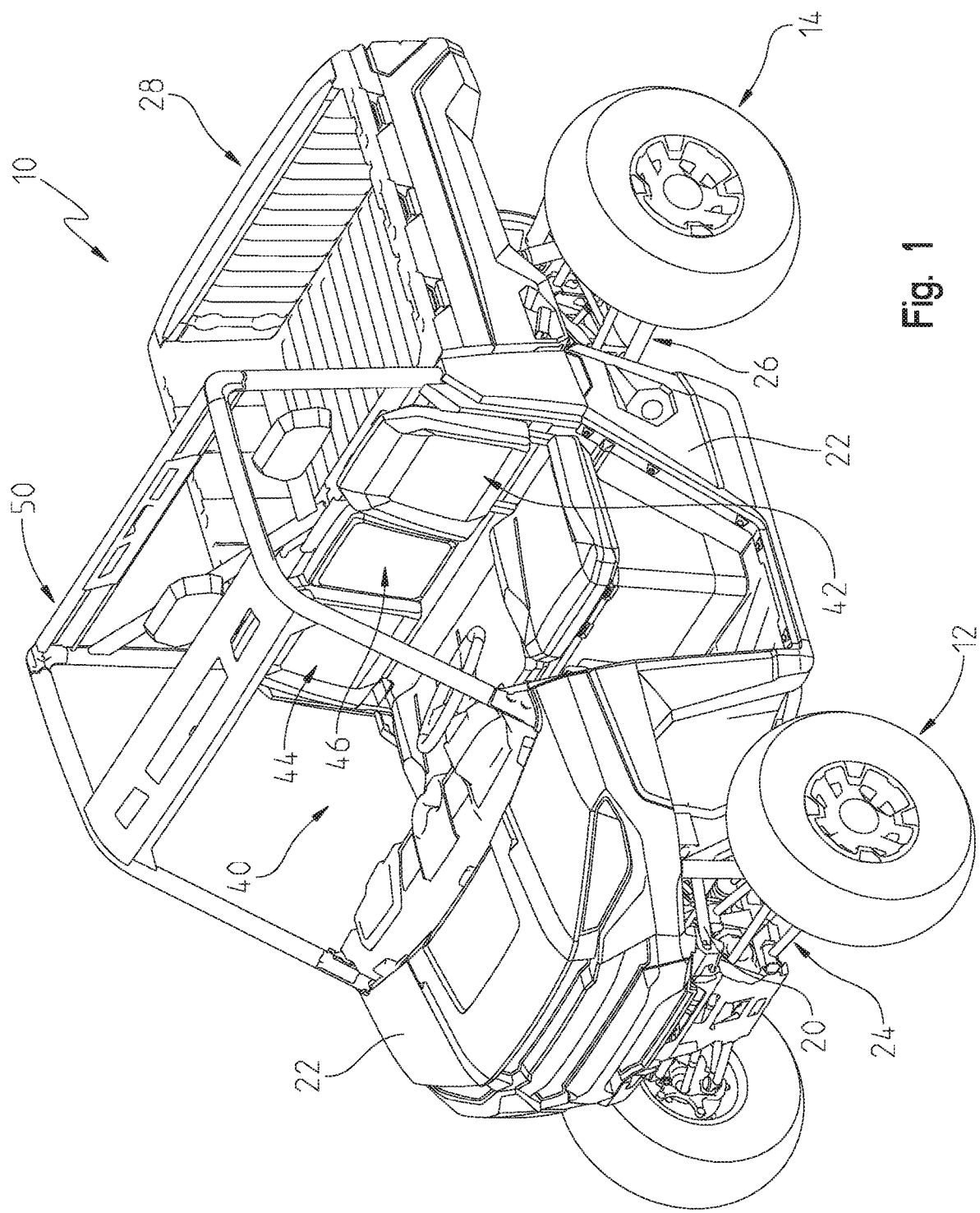
FIG. 1 is a front left perspective view of a series hybrid utility vehicle of the present disclosure.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Figure 2:
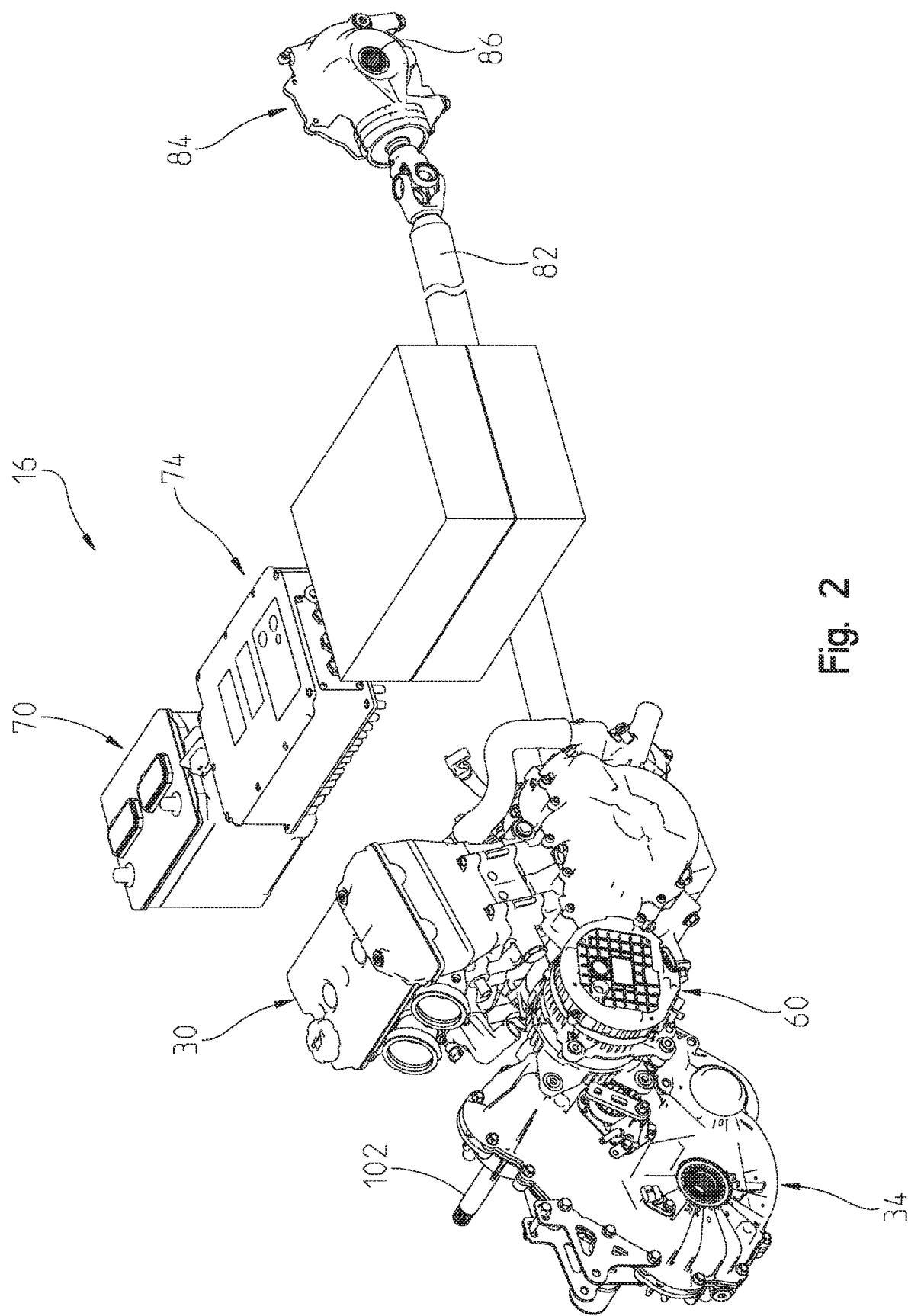
FIG. 2 is a rear right perspective view of a first embodiment of a powertrain assembly of the series hybrid utility vehicle of the present disclosure.
Figure 3:
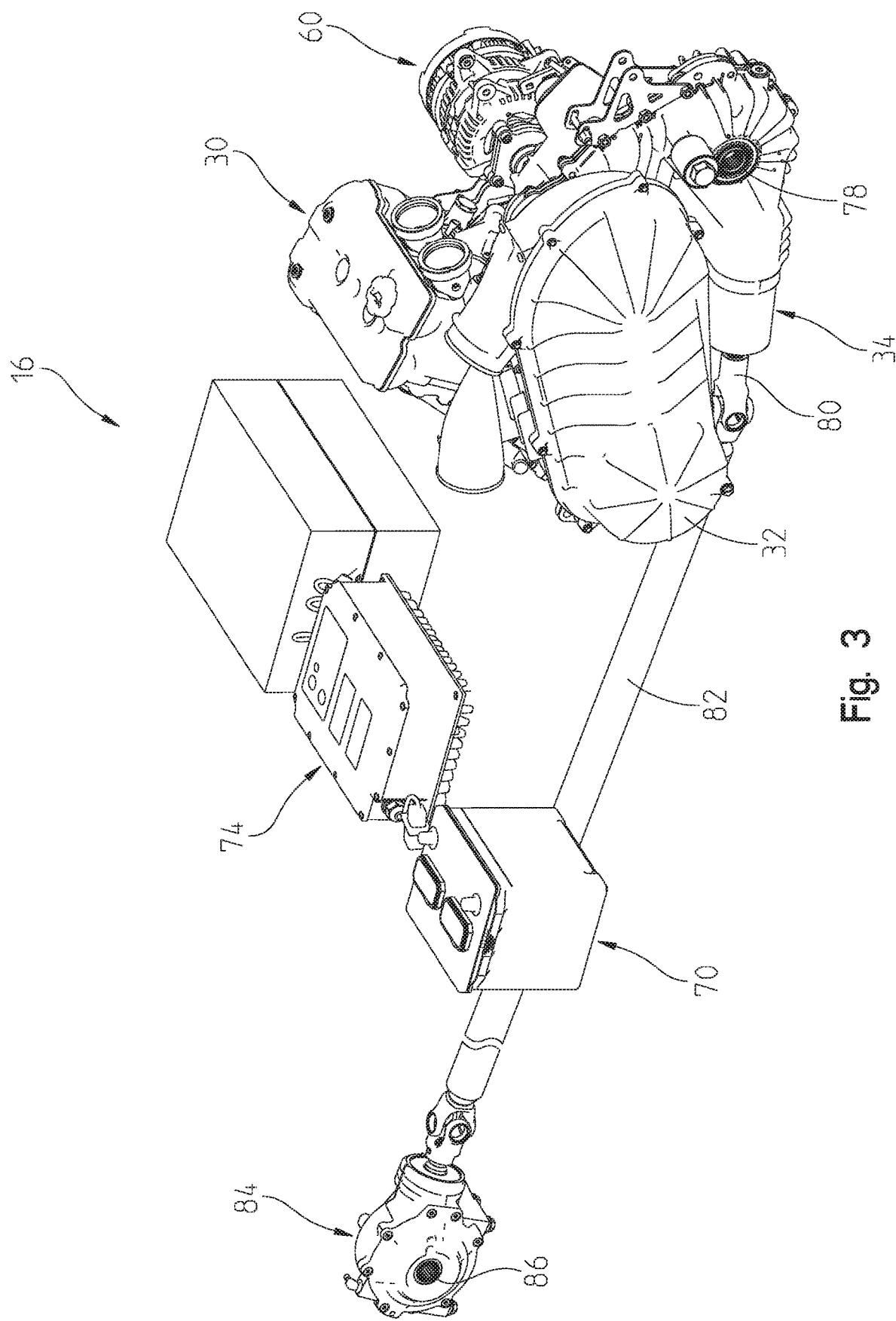
FIG. 3 is a rear left perspective view of a driveline of the series hybrid utility vehicle of FIG. 2.
Figure 4:
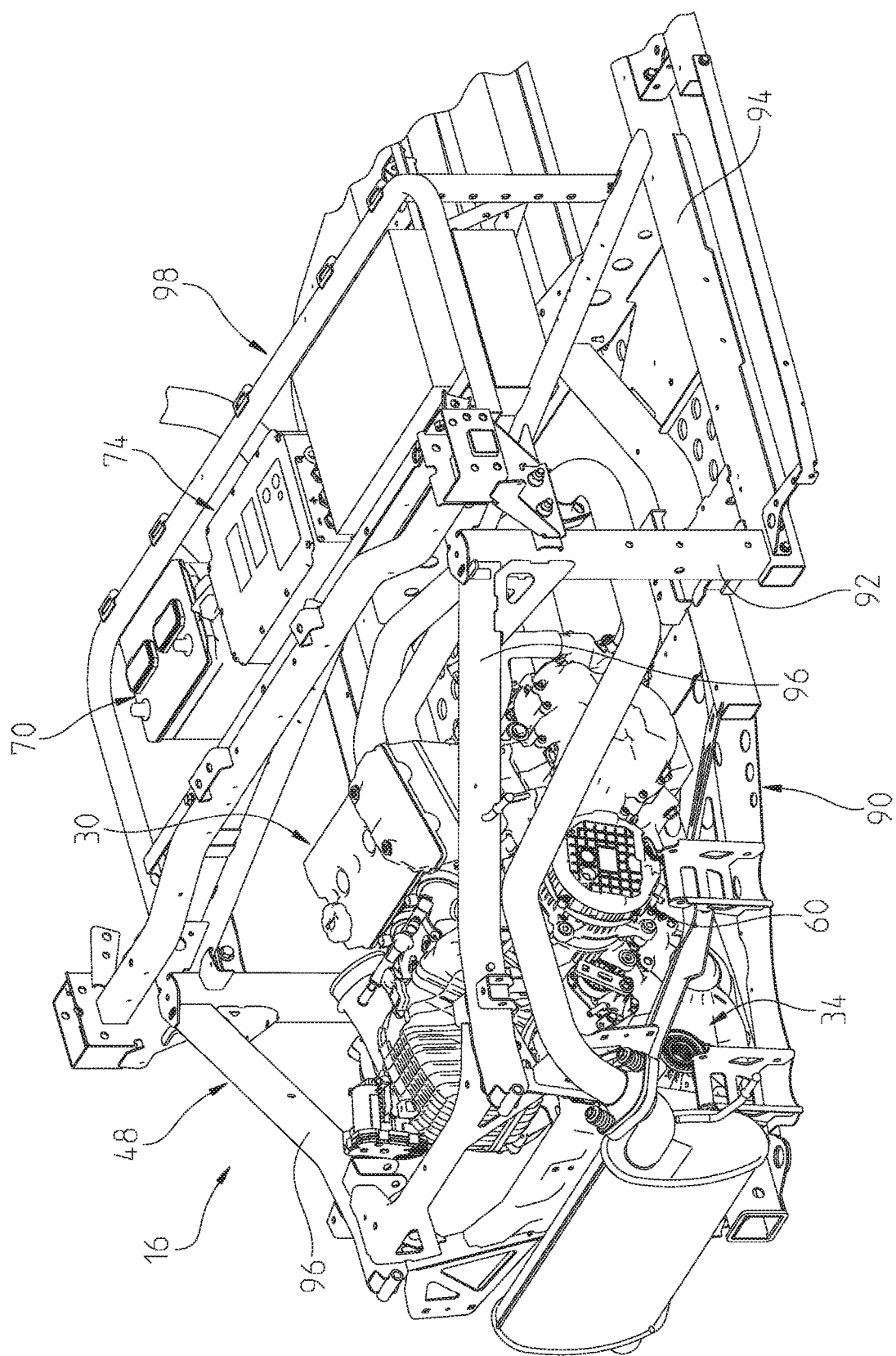
FIG. 4 is a rear right fragmented perspective view of the drivetrain of FIG. 2 in the frame.
Figure 5:
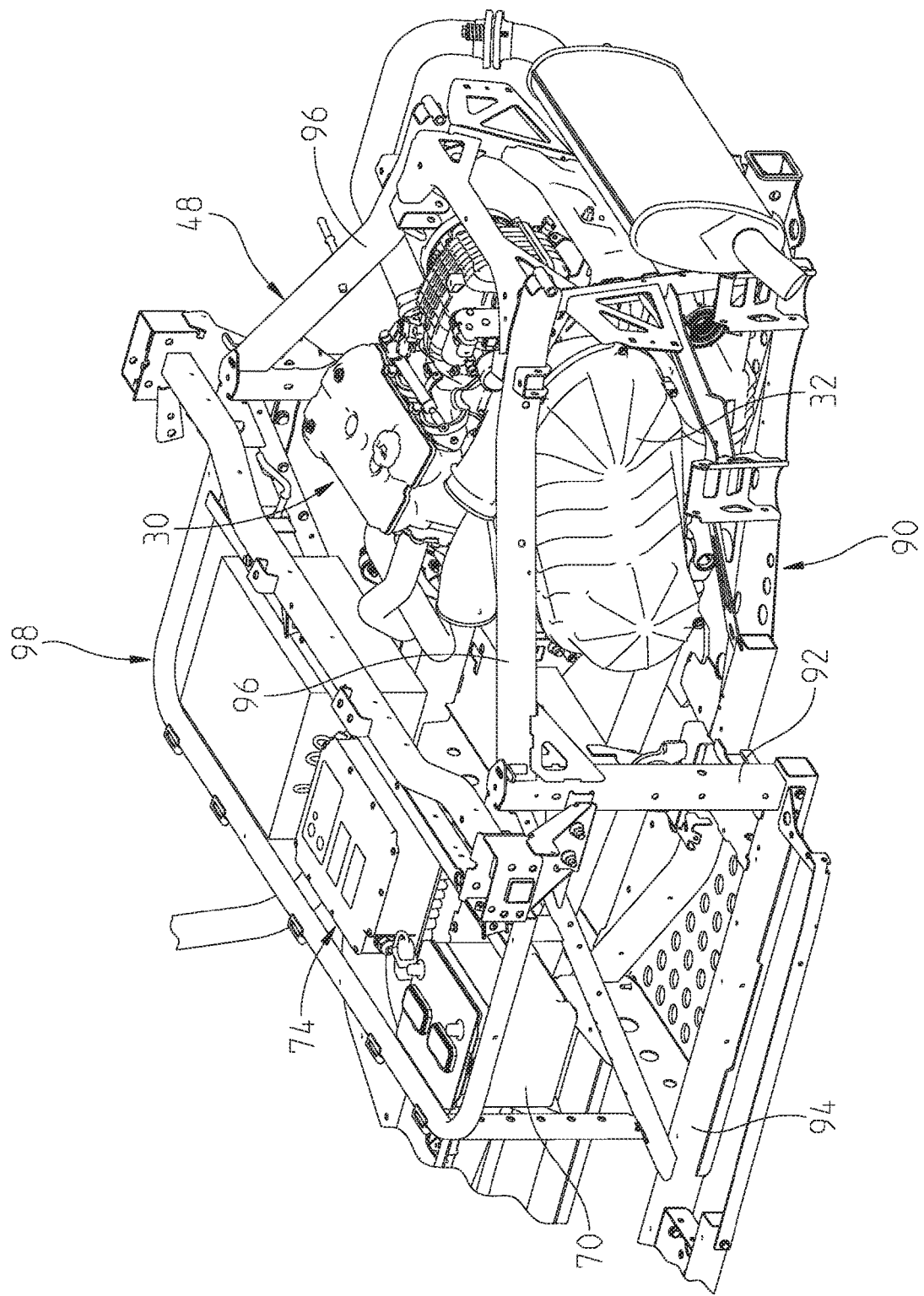
FIG. 5 is a rear left fragmented perspective view of the drivetrain of FIG. 4.

Referring first to FIGS. 1-3, an illustrative embodiment of a hybrid utility vehicle 10 is shown, and includes ground engaging members, including front ground engaging members 12 and rear ground engaging members 14, a powertrain assembly 16 (FIG. 2), a frame 20, a plurality of body panels 22 coupled to frame 20, a front suspension assembly 24, a rear suspension assembly 26, and a rear cargo area 28. In one embodiment, one or more ground engaging members 12, 14 may be replaced with tracks, such as the PROSPECTOR II tracks available from Polaris Industries, Inc. located at 2100 Highway 55 in Medina, Minn. 55340, or non-pneumatic tires as disclosed in any of U.S. Pat. No. 8,109,308, filed on Mar. 26, 2008; U.S. Pat. No. 8,176,957, filed on Jul. 20, 2009; and U.S. Pat. No. 9,108,470, filed on Nov. 17, 2010; and U.S. Patent Application Publication No. 2013/0240272, filed on Mar. 13, 2013, the complete disclosures of which are expressly incorporated by reference herein. Vehicle 10 may be referred to as a utility vehicle ("UV"), an all-terrain vehicle ("ATV"), or a side-by-side vehicle ("SxS") and is configured for travel over various terrains or surfaces. Furthermore, vehicle may be similar to that disclosed in U.S. Patent application publication 20170355259, the complete disclosure of which is expressly incorporated by reference herein. More particularly, vehicle 10 may be configured for military, industrial, agricultural, or recreational applications.

Powertrain assembly 16 is operably supported on frame 20 and is drivingly connected to one or more of ground engaging members 12, 14. As shown in FIGS. 2-5, powertrain assembly 16 may include an engine 30 (FIG. 2) and a transmission, for example a continuously variable transmission ("CVT") 32 (FIG. 3) and/or a shiftable transmission 34. Transmission 34 is shown as a transaxle which includes a combination shiftable transmission and final drive. However, the transmission and final drive may be separated and coupled together as shown in U.S. Pat. No. 8,596,405. Engine 30 may be a fuel-burning internal combustion engine, however, any engine assembly may be contemplated, such as hybrid, fuel cell, or electric engines or units. In one embodiment, powertrain assembly 16 includes a turbocharger (not shown) and engine 30 is a diesel internal combustion engine. Additional details of CVT 32 may be disclosed in U.S. Pat. Nos. 3,861,229; 6,120,399; 6,176,796 6,860,826; and 6,938,508, the complete disclosures of which are expressly incorporated by reference herein.

As shown in FIG. 1, front suspension assembly 24 and rear suspension assembly 26 may be similar to that described in U.S. Pat. No. 7,819,220, filed Jul. 28, 2006, the complete disclosure of which is expressly incorporated by reference herein. Alternatively, rear suspension assembly 26 may be as shown and described in U.S. Patent Application Publication No. 2012/0031693, filed Aug. 3, 2010, titled "SIDE-BY-SIDE ATV, the complete disclosure of which is expressly incorporated by reference herein.

Referring again to FIG. 1, vehicle 10 includes an operator area 40 supported by frame 20, and which includes seating for at least an operator and a passenger. Illustratively, one embodiment of vehicle 10 includes three seats, including an operator seat 42, a front passenger seat 44, and a middle seat 46. Operator seat 42 includes a seat bottom and a seat back. Similarly, front passenger seats 44 and 46 include a seat bottom and a seat back.

As described above, vehicle 10 includes frame 20 supported by ground engaging members 12, 14. Illustratively, rear frame portion 48 (FIGS. 4 and 5) supports powertrain assembly 16 and rear cargo area 28. Vehicle 10 also comprises an overhead or upper frame portion 50. Upper frame portion 50 is coupled to frame 20 and cooperates with operator area 40 to define a cab of vehicle 10. Additional details of vehicle 10 may be disclosed in U.S. Pat. No. 8,998,253, filed Mar. 28, 2013, the complete disclosure of which is expressly incorporated by reference herein.

Referring to FIGS. 2 and 3, in one embodiment, vehicle 10 is a series hybrid utility vehicle configured for engine and electrical operation. Vehicle 10 includes a motor/generator 60 operably coupled to transmission 34 to provide input power to the transmission as further described herein. Vehicle 10 further includes a plurality of batteries 70 for driving motor/generator 60 and which can be charged by the engine 30 as further described herein. While only one battery 70 is shown, it should be understood that multiple batteries may be coupled together or a battery pack may be provided. An engine control unit 74 is provided to assist in the control of the motor/generator 60. As shown best in FIG. 3, vehicle 10 further includes a transmission rear output at 78 for coupling to half shafts (not shown) to drive the rear wheels 14, and a front output 80 which couples to a drive shaft 82 which in turn is coupled to a front final drive 84 having a front output at 86. It should be appreciated that half shafts (not shown) are coupled to the front wheels 12 and driven by output at 86.

With reference again to FIGS. 4 and 5, powertrain 16 is shown mounted within rear frame portion 48. As shown, rear frame portion 48 includes a lower frame portion 90 which supports engine 30 and transaxle 34. Rear frame portion 48 further includes upstanding posts 92 coupled to longitudinal rails 94 which support rearwardly extending frame tubes 96 which enclose the powertrain 16 yet provide support for utility bed 28 (FIG. 1). A seat support 98 is provided which is supported by longitudinal frame tubes 94 and enclose battery 70 and engine control unit 74. Seat support 94 supports the operator and passenger seats 42, 44, 46.

Figure 6:
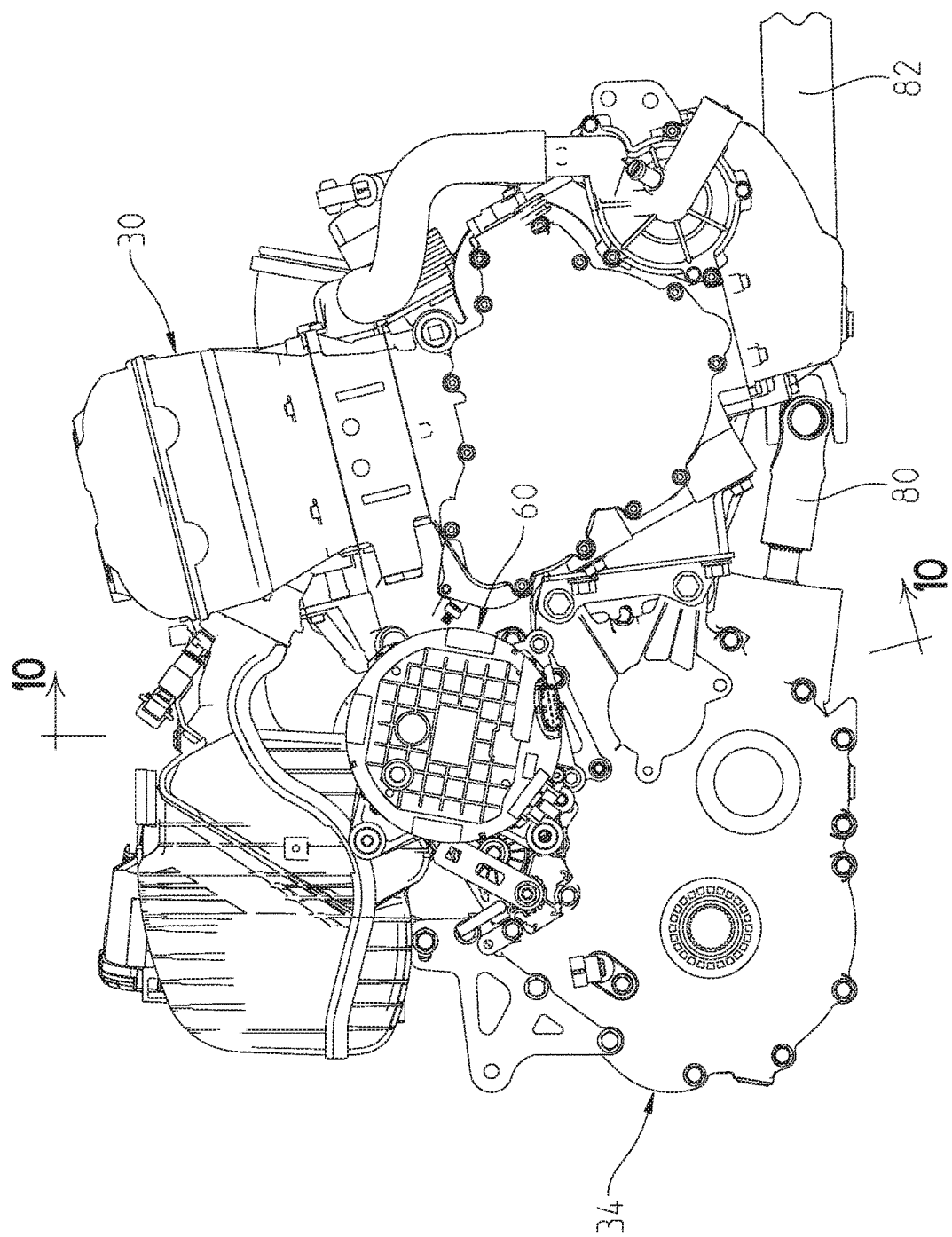
FIG. 6 is a right side view of the drive train of FIG. 2.
Figure 7A:
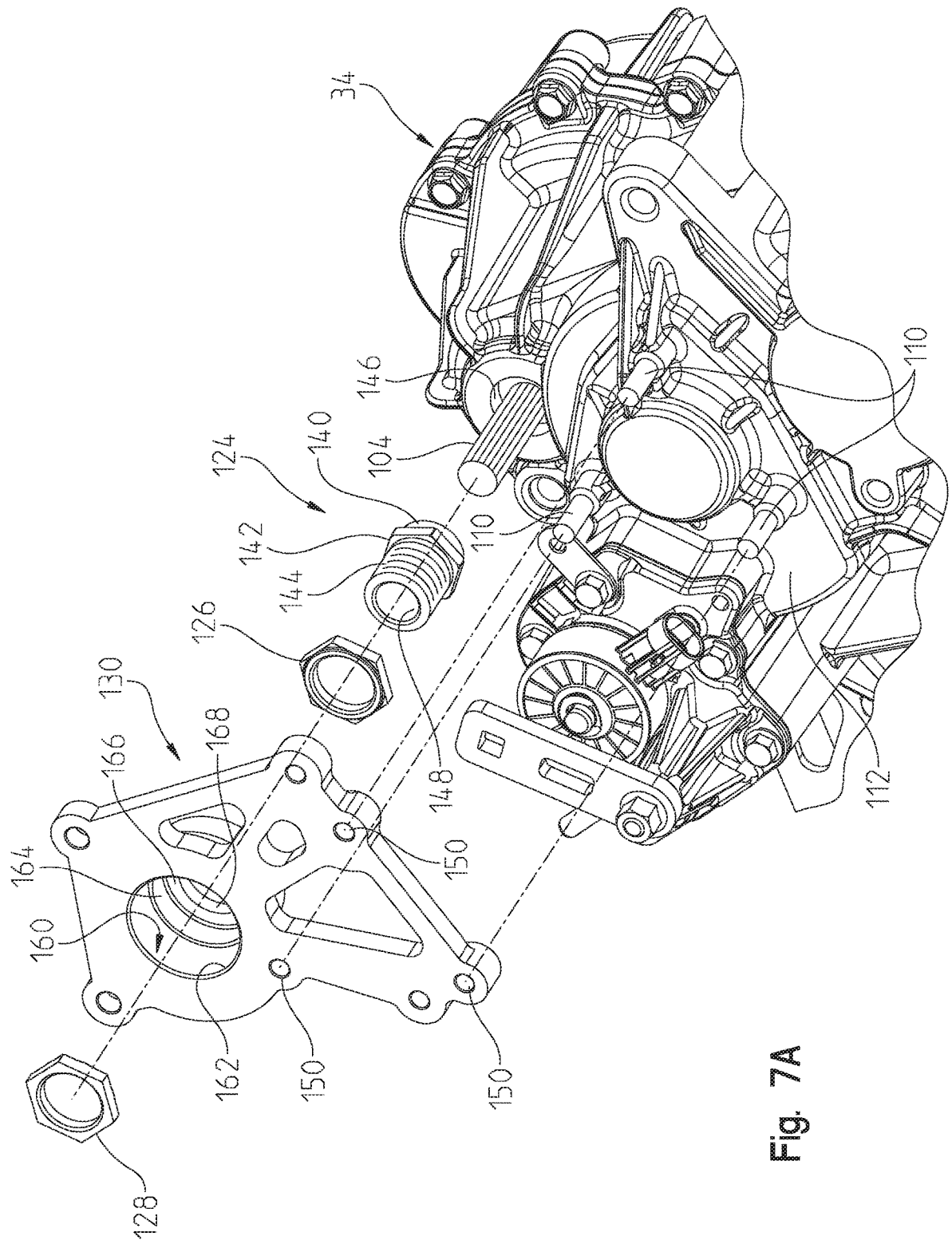
FIG. 7A is an enlarged portion of the coupling mechanism shown in FIG. 7.
Figure 8:
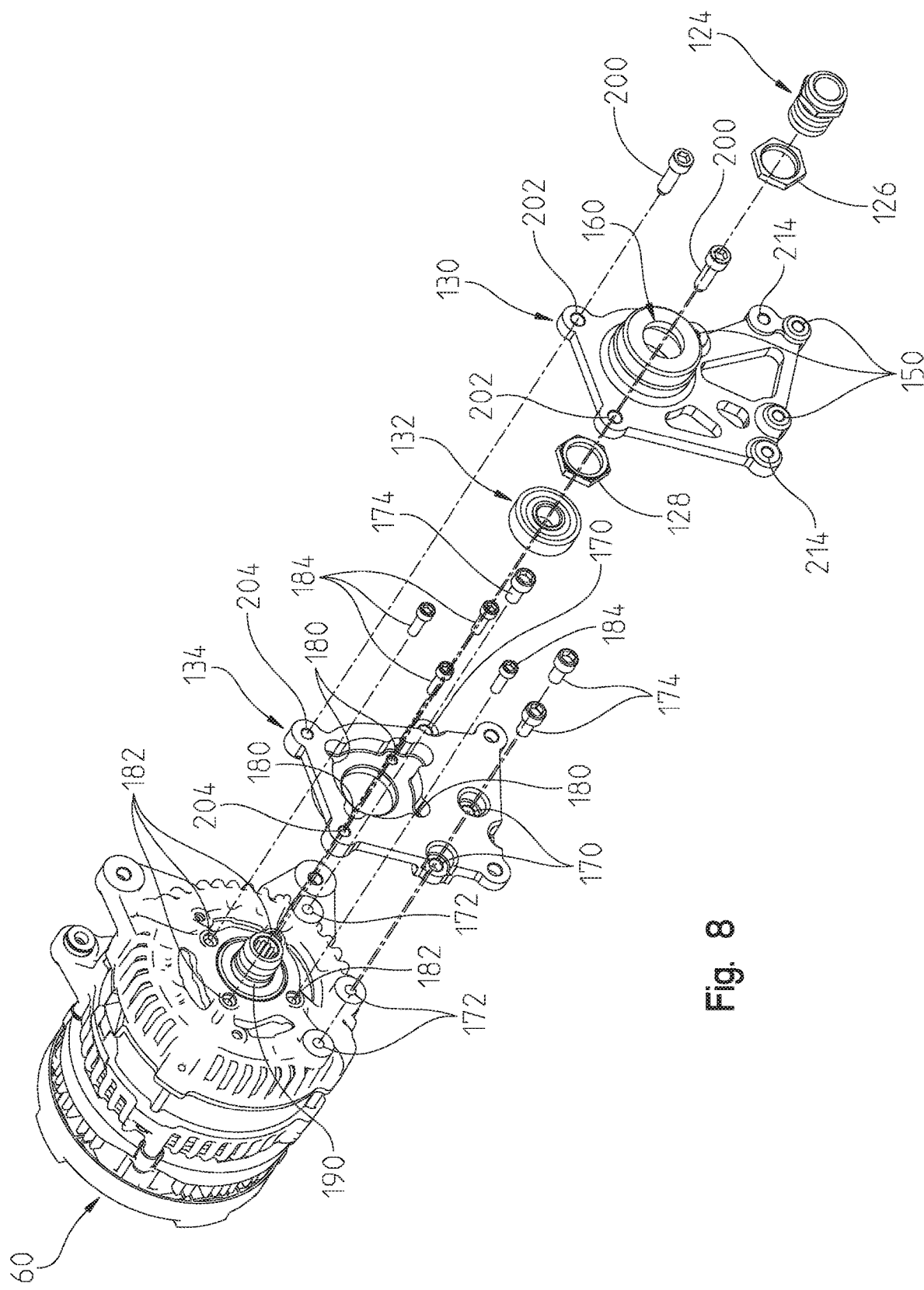
FIG. 8 is an exploded view showing the motor/generator and the mounting bracket.

With reference now to FIGS. 6-8, the mounting of the motor/generator 60 and the coupling to the transaxle 34 will be described in greater detail. As shown best in FIG. 7, transaxle 34 includes an upper input shaft 100 which is internally split to provide a shaft portion 102 and shaft portion 104. Shaft portion 102 receives power input from CVT 32 whereas shaft portion 104 receives power input from motor/generator 60. As is known, engine 30 would drive a drive clutch of CVT 32 which internally drives a driven clutch of CVT 32, and the driven clutch of CVT 32 would couple to the shaft portion 102. The hybrid drive aspect will now be described in greater detail herein, with a first discussion regarding the mounting of the motor/generator 60 to the transmission 34.

With reference now to FIGS. 7, 7A and 8, transaxle 34 includes three threaded posts or studs 110 (FIG. 7A) extending outwardly from a housing 112 of the transaxle on the same side of the transaxle as shaft portion 104. As described herein, studs 110 correspond with lock nuts 114. As shown best in FIG. 7, a mounting assembly 120 is provided for mounting motor/generator 60 to the transaxle 34. As shown in FIGS. 7 and 7A, mounting assembly 120 includes a spacer 124, lock nuts 126 and 128, inner bracket 130, bearing 132 and outer bracket 134. Spacer 124 includes a threaded portion 140, a hexagonal portion 142 and a threaded portion 144. It should be appreciated that the transaxle housing 112 includes a threaded opening 146 positioned around shaft portion 104, which threadedly receives threaded portion 140 of spacer 124. Spacer 124 also includes an opening at 148 which is larger than shaft portion 104 such that when spacer 124 is threaded into opening 146, shaft portion 104 extends through spacer 124 but does not contact spacer 124. Lock nut 126 is threaded onto threaded portion 144 of spacer 124 and may float in order to define the lateral position of inner bracket 130 as described herein.

Figure 9:
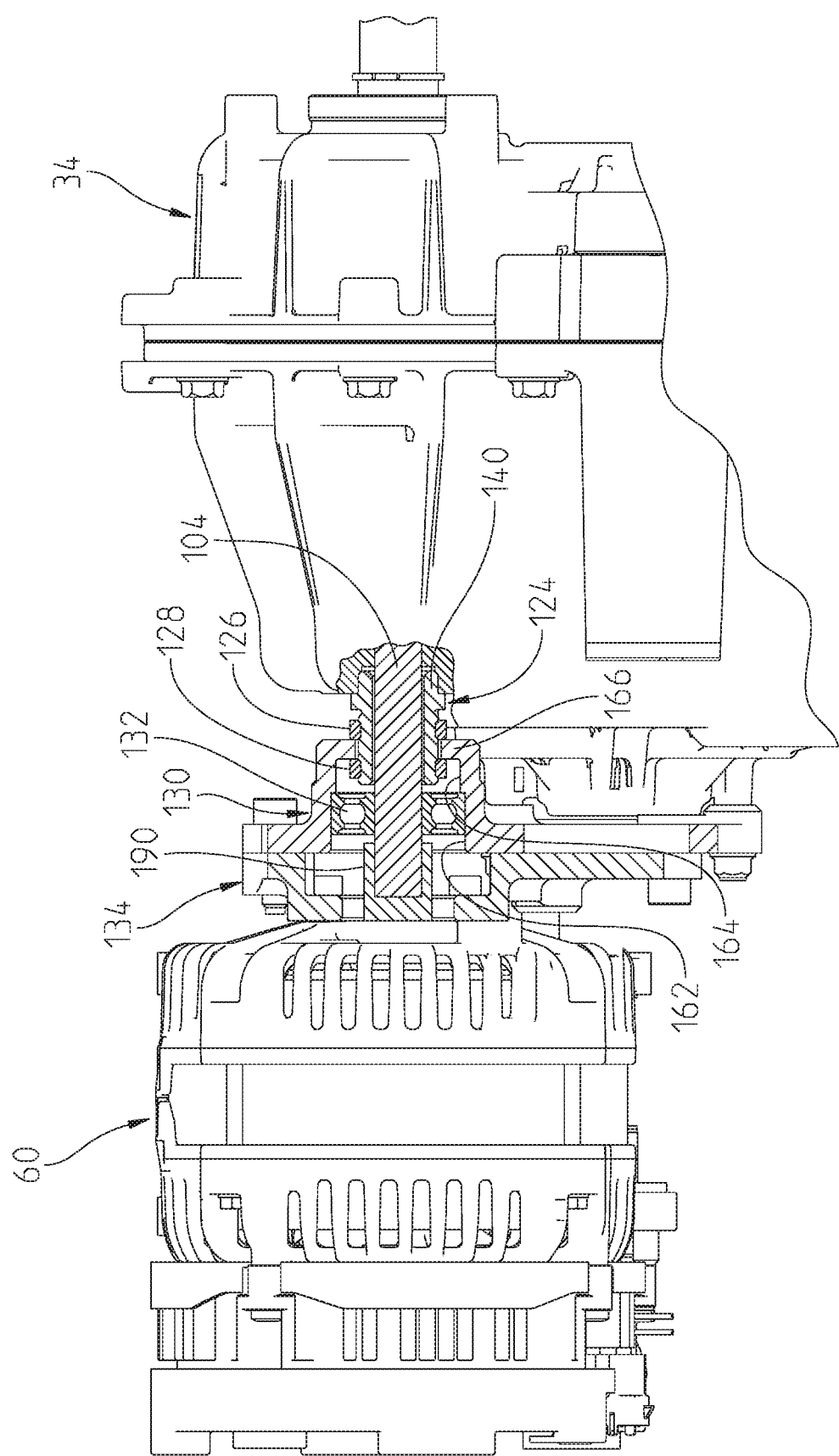
FIG. 9 is a partial cross-sectional view showing the coupling between the motor/generator and the transmission.

Once coupler 124 is attached to threaded opening 146, inner bracket 130 may be mounted to transaxle 34. As shown best in FIG. 7A, inner bracket 130 includes three apertures at 150 which correspond with threaded posts 110 such that inner bracket 130 may be positioned over transaxle 34. It should also be appreciated that lock washer 126 is moved to an inward most position to allow the positioning of inner bracket 130. Inner bracket 130 includes an opening at 160 which includes an enlarged diameter portion 162, reduced diameter portion 164, shoulder 166 and opening 168. It should be appreciated that threaded portion 144 of spacer 124 may be received through opening 168 of inner bracket 130 and that lock washer 128 is positioned through opening 162 and is threadably received on the threaded portion 144 which protrudes through opening 168. Bearing 132 is then received within the diameter portion 162 of opening 160. This can be seen best in the cross-sectional view of FIG. 9. With bearing 132 positioned within diameter portion 162, shaft 104 is carried within the bearing 132. Lock nuts 126 and 128 are tightened against bracket 130, as shown best in FIG. 9. Lock nuts 114 are also coupled to the threaded studs 110, which couples the inner bracket 130 to the transmission 34.

Outer bracket 134 is shown best in FIG. 8, and includes a plurality of recessed openings 170 which align with threaded bosses 172 on motor/generator 60 to receive cap screws 174 therethrough to couple the outer bracket 134 to the motor/generator 60. Outer bracket 134 further includes openings 180 which align with threaded openings 182 on motor/generator 60 and receive fasteners 184 therethrough to further couple outer bracket 134 to motor/generator 60. The two brackets 130, 134 are now aligned which also aligns shaft portion 104 with output shaft 190 of motor/generator 60. Shaft 190 is internally splined which couples with shaft portion 104. Brackets 130 and 134 may then be coupled together by way of fasteners 200 extending through apertures 202 of bracket 130 and into threaded openings 204 of outer bracket 134. As shown in FIG. 7, fasteners 210 may also be received through apertures 212 of bracket 134 and into threaded engagement with threaded apertures 214 of bracket 130. Thus as coupled together as described above, either the motor/generator 60 or CVT 32 may provide input power to the transaxle through corresponding input shafts 104, 102. This provides multiple modes of operation of the hybrid vehicle as described herein.

Figure 10:
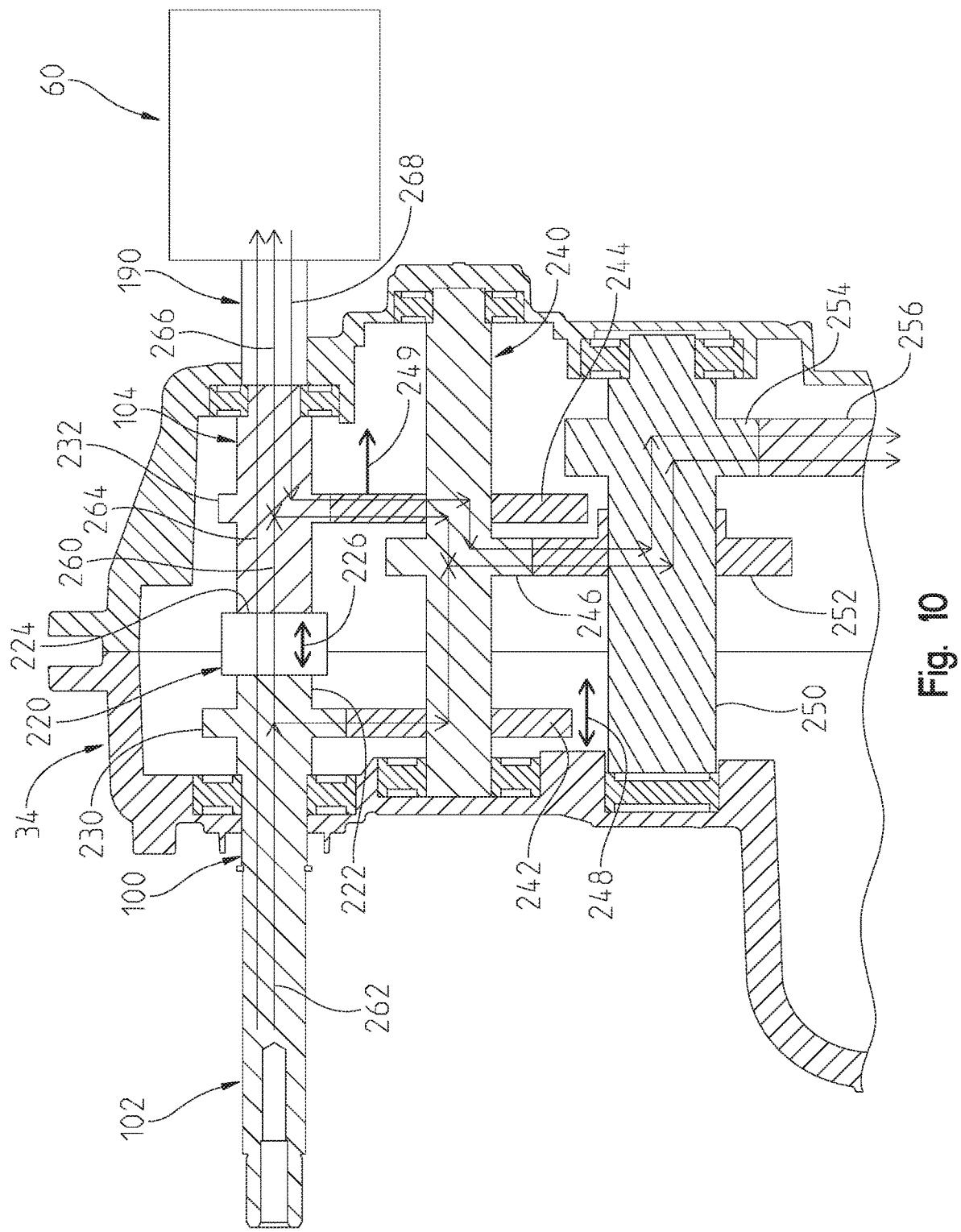
FIG. 10 is a cross-sectional view through lines 10-10 of FIG. 6 illustrating the power flow between various components of the hybrid utility vehicle of FIG. 2 in various drive modes.

With reference now to FIG. 10, the inner gearing of the transaxle 34 will be described in greater detail. As shown, shaft portions 102 and 104 are separated but may be coupled together by way of coupler 220. The end of shaft 102 has a splined portion at 222 and the end of shaft 104 has a splined portion 224, where both splined portions 222 and 224 extend into a splined coupling portion of coupler 220. Coupler 220 is laterally movable along the direction of arrow designated as 226 such that when in the position shown in FIG. 10, the two. 104 are coupled together and act as one. If the coupler 220 is moved to the left as viewed in FIG. 10, shaft portion 104 is decoupled from shaft portion 102 whereas when the coupler is moved to the right as viewed in FIG. 10, shaft portion 102 is decoupled from shaft portion 104. As shown, shaft portion 102 includes a gear at 230 and shaft portion 104 includes a gear at 232. An intermediate shaft 240 is provided which provides a gear 242 in meshing engagement with gear 230 and a gear 244 in meshing engagement with gear 232. Shaft 240 further includes a gear 246. As shown in FIG. 10, gear 242 may be laterally movable in the direction of arrow 248, for example by way of a dog clutch (not shown) whereby gear 242 may be moved into and out of meshing engagement with gear 230. In a similar manner, and as shown in FIG. 10, gear 244 may be laterally movable in the direction of arrow 249, for example by way of a dog clutch (not shown) whereby gear 244 may be moved into and out of meshing engagement with gear 232.

A lower shaft 250 is provided having a gear 252 in meshing engagement with gear 246 and shaft 250 includes a gear 254 in meshing engagement with a gear 256. It should be appreciated that gear 256 provides the output to transaxle outputs 78 and 80 (FIG. 3). It should also be appreciated that a combination of gears 232 and 244 represent a low gear, that is a high torque gear, whereas the combination of gears 230 and 242 represent a high gear, that is a higher speed gear. Thus with the coupling as described, multiple modes of operation of the transaxle are available. For example as shown in FIG. 10, a power path 260 provides for an engine drive for low gear, power path 262 provides engine drive for a high gear, power path 264 provides for a charge at rest mode, power path 266 provides a charge and drive mode and power path 268 provides a motor only drive in low gear. The various modes will now be described with relation to FIGS. 10A-10E.

With reference first to FIG. 10A, the engine only in high gear power path is shown where coupler 220 is shown moving to the right along path 226 such that shaft portion 104 is decoupled from shaft portion 102. Thus, power from the CVT 34 to shaft 102 provides power along power path 280 to power path 282 (through gears 230, 242), through power path 284 (through shaft 240), through power path 286 (through gears 246, 252), through power path 288 (through shaft 250) and through power path 290 (through gears 254, 256). As mentioned above, the power through power path 290 provides power to both outputs of the transaxle at 80 and 86.

Figure 10B:
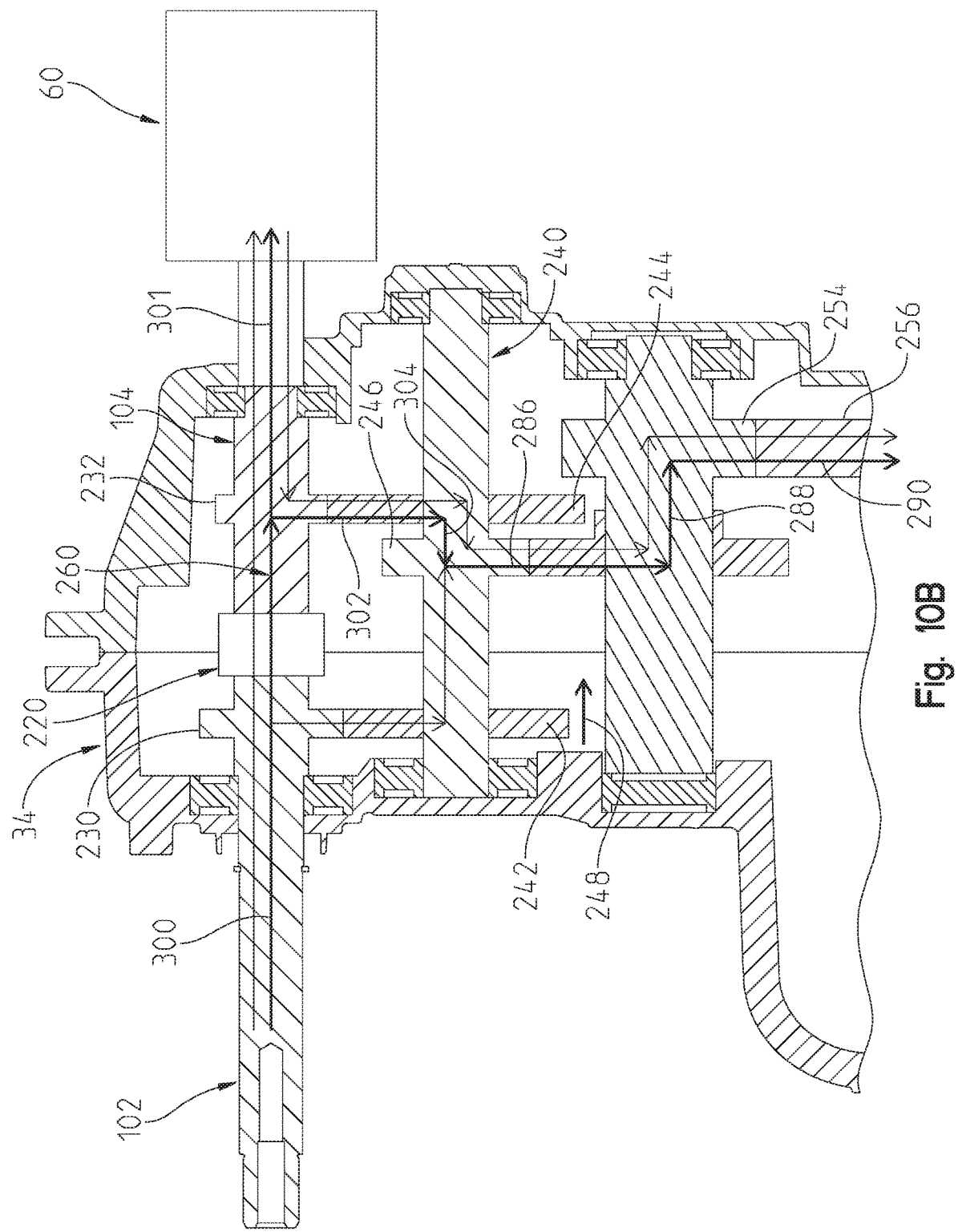
FIG. 10B is a view similar to that of FIG. 10, showing the drive mode with the engine and motor drive in low gear defining a "Charge-and-Drive" drive mode.

With reference now to FIG. 10B, the power path will be described to define a "charge and drive mode" whereby power from only the engine 30 provides input power through the low gear setting of transaxle 34. In this mode, coupler 220 couples together shaft portions 102 and 104 and gear 242 is moved to the right as viewed in FIG. 10B to decouple gear 242 from gear 230. Thus power moves along power path 300 (through shaft portions 102 and 104) to power path 302 (through gears 232, 244), through power path 304 (through shaft 240), and then through power paths 286, 288 and 290 as described above. As shown in this mode in FIG. 10B, power is also provided to motor/generator 60 (in the generator mode) through power path 301 to charge the batteries 70.

Figure 10C:
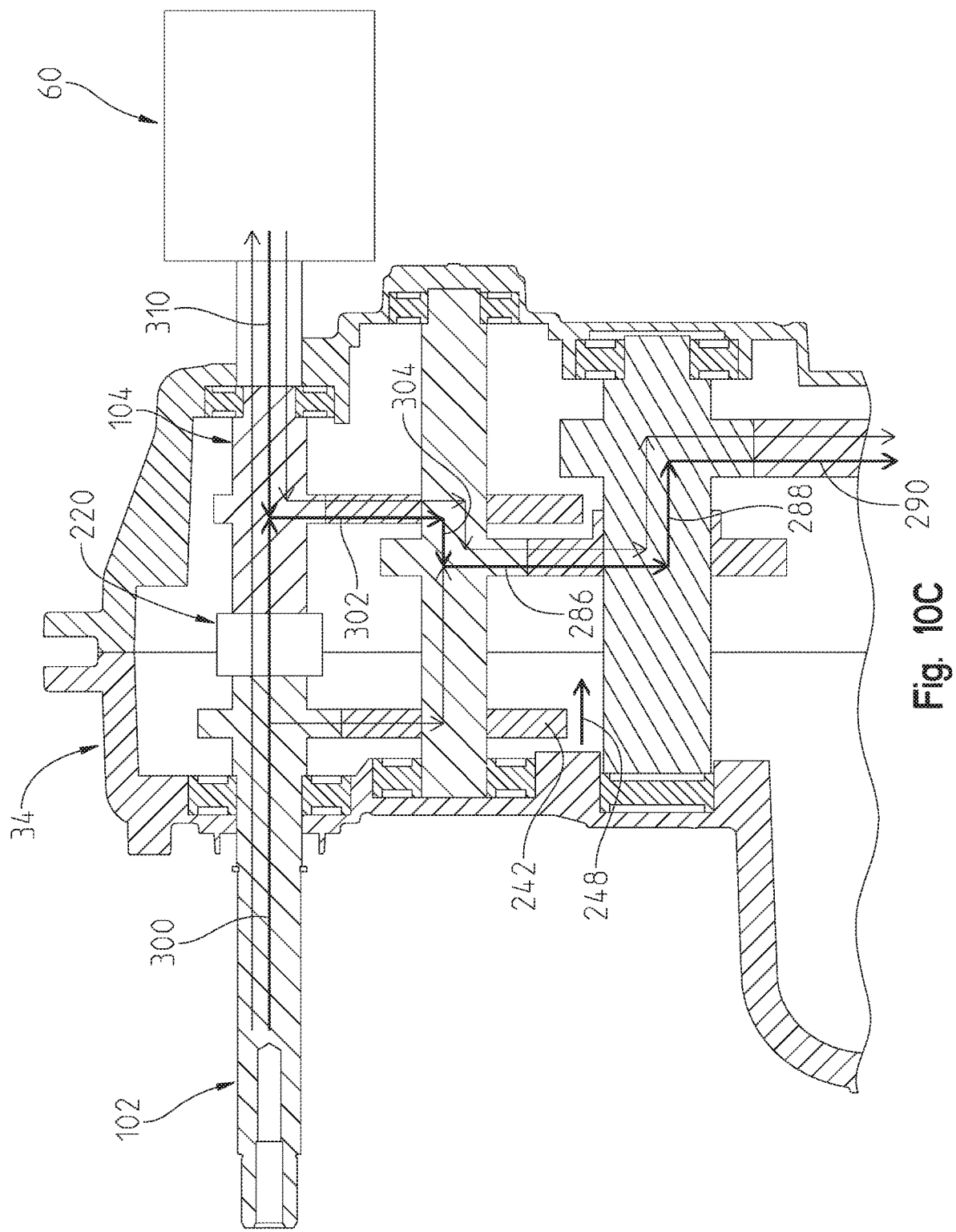
FIG. 10C is a view similar to that of FIG. 10, showing a full performance drive mode with the engine and motor/generator drive in low gear.

With reference now to FIG. 10C, a "full performance" mode is shown where input may be received from both the engine 30 and the motor/generator 60 where the power path is virtually identical to that shown in FIG. 10B, with the exception that a power path 310 is also provided from motor/generator 60 through shaft 104. The power path therefore includes input power paths 300 and 310 which couples to power paths 302, 304, 286, 288 and 290.

Figure 10D:
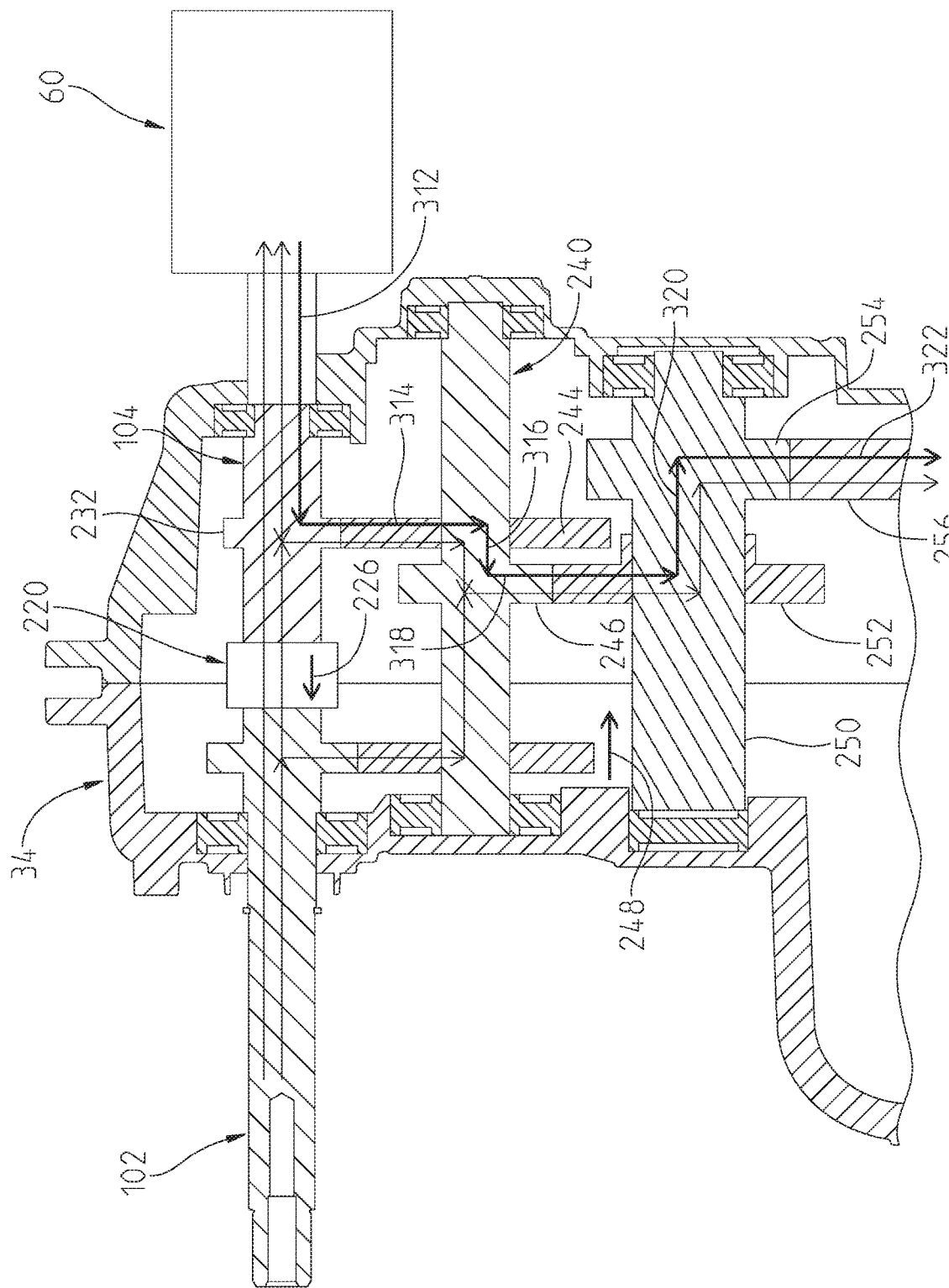
FIG. 10D is a view similar to that of FIG. 10, showing the drive mode with the motor drive only in low gear.

With reference now to FIG. 10D, an electric only "stealth" mode is shown where coupler 220 is moved to the left as viewed in FIG. 10D to a position to decouple shaft portion 102 from shaft portion 104. Thus, the motor provides input power along power path 312 (through shaft 104) to power path 314 (through gears 232, 244), along power path 316 (through shaft 240), through power path 318 (through gears 246, 252), through power path 320 (through shaft 250) and through power path 322 (through gears 254, 256).

Figure 10E:
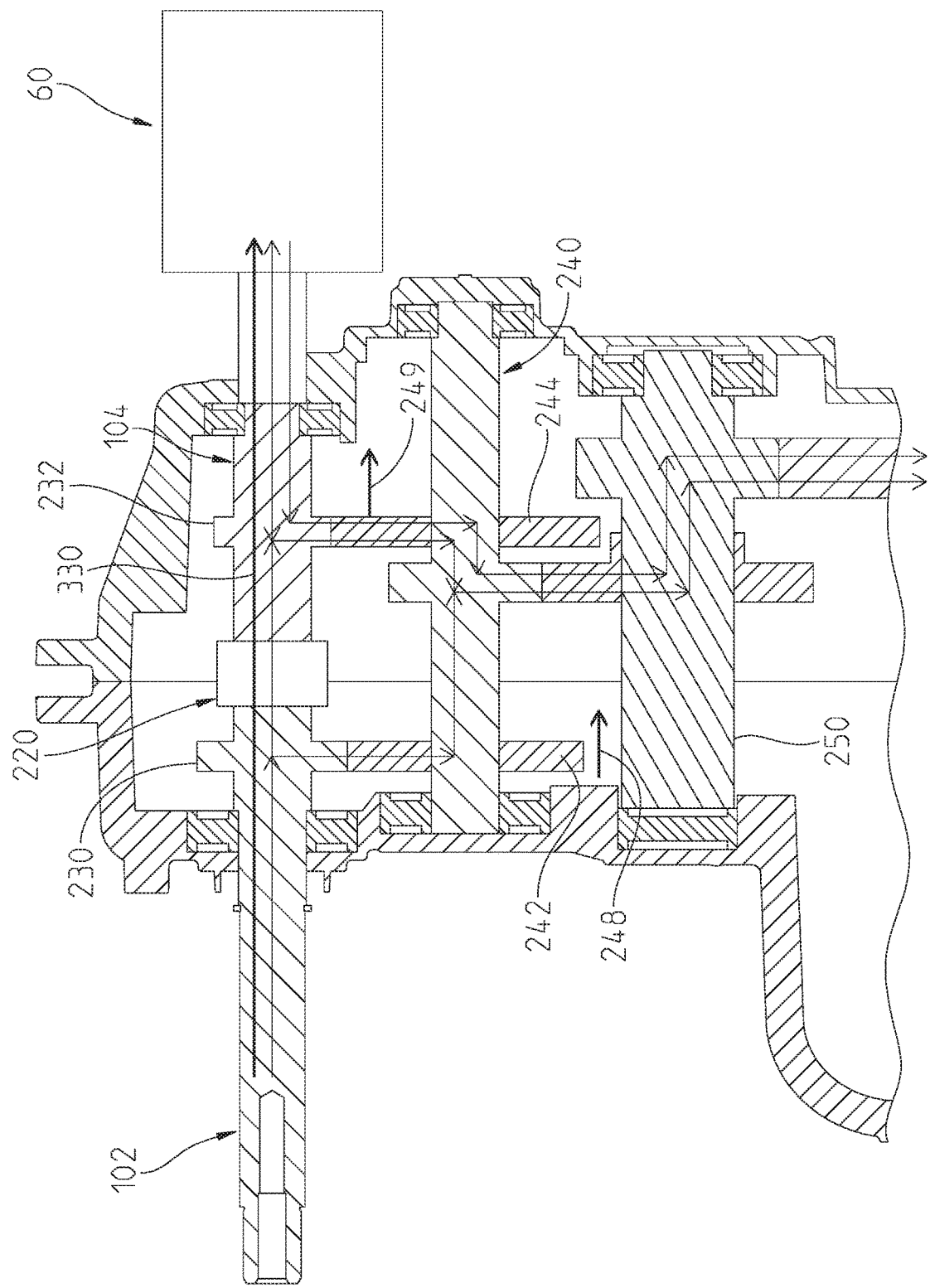
FIG. 10E is a view similar to that of FIG. 10, showing a "Charge-at-Rest" drive mode.

With reference now to FIG. 10E, a "charge at rest" mode is shown where coupler 220 couples together shaft portions 102 and 104 and where gears 242 and 244 are moved to the right as viewed in FIG. 10E to decouple them from their corresponding gears 230 and 232 such that only the shaft portions 102, 104 are driven and shafts 240 and 250 remain idle. In this mode, the vehicle is not moving and therefore at rest and only the generator portion of the motor/generator 60 is utilized for recharging the batteries 70.

Figure 12:
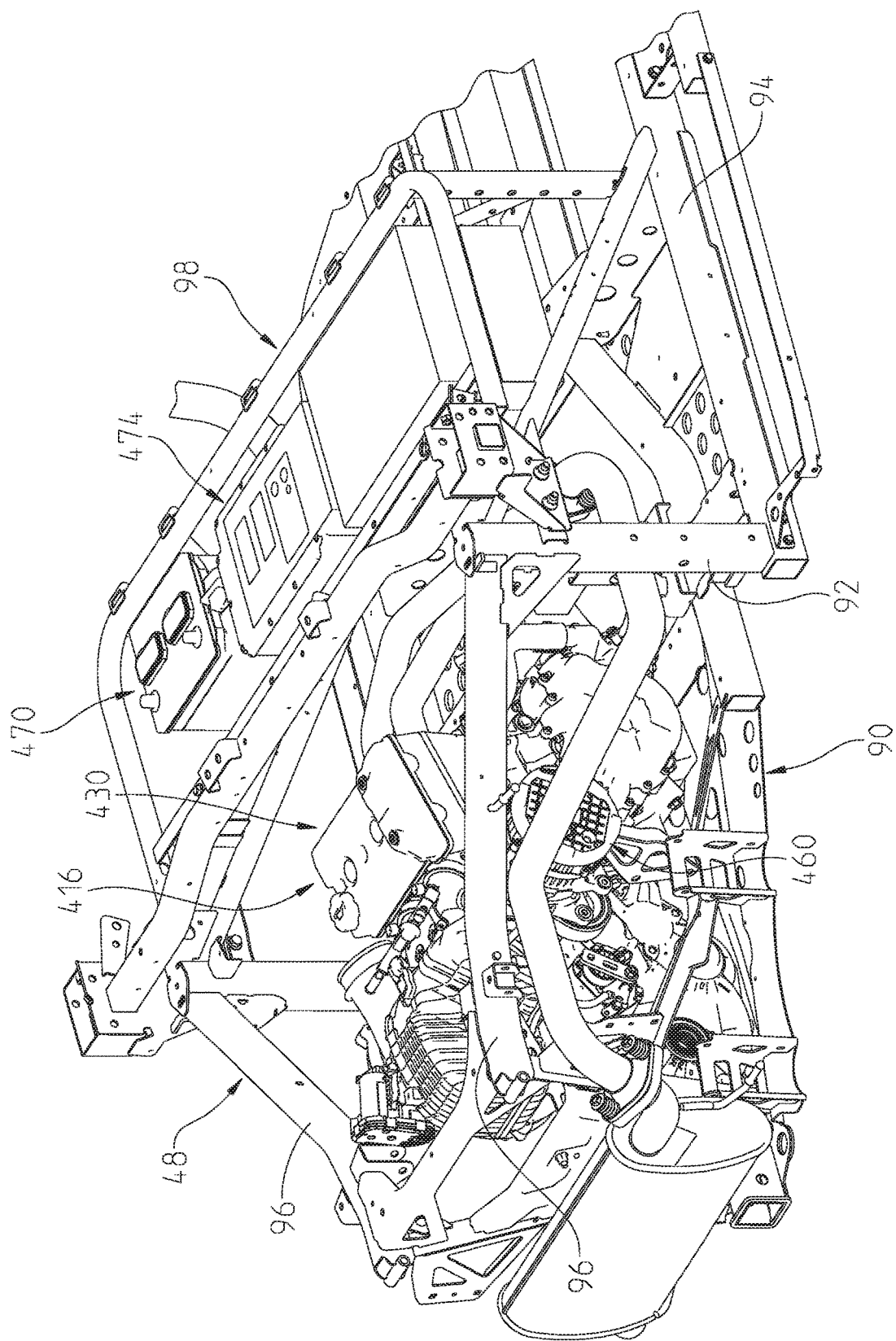
FIG. 12 is a rear right fragmented perspective view of the drivetrain of FIG. 11 in the frame.

With reference now to FIGS. 11-16G, a second embodiment of hybrid drivetrain will be described. With reference first to FIGS. 11-15, a hybrid drive is shown at 416 which is similar to the hybrid drive 16 described above. Hybrid drive 416 includes engine 430, transaxle 434, motor/generator 460, batteries 470, motor controller 474, transaxle output 478, front output 480 (FIG. 13), drive shaft 482, front final drive 484 and front output 486. The difference in the embodiment of FIG. 11 from that of FIG. 2 relates to the manner in which motor/generator 460 is coupled to the transmission 434. In this embodiment, motor/generator 460 is coupled to the transaxle 434 by way of a belt 490 and pulleys or sheaves 492, 494 (FIG. 14) which provides power into the transaxle as described herein. As shown in FIG. 12, hybrid powertrain 416 is packaged in the rear frame portion 48 in much the same manner as described above with respect to hybrid powertrain 16. Motor 460 is coupled to transmission 434 by way of mounting assembly 520, as shown best in FIGS. 14 and 15.

Figure 13:
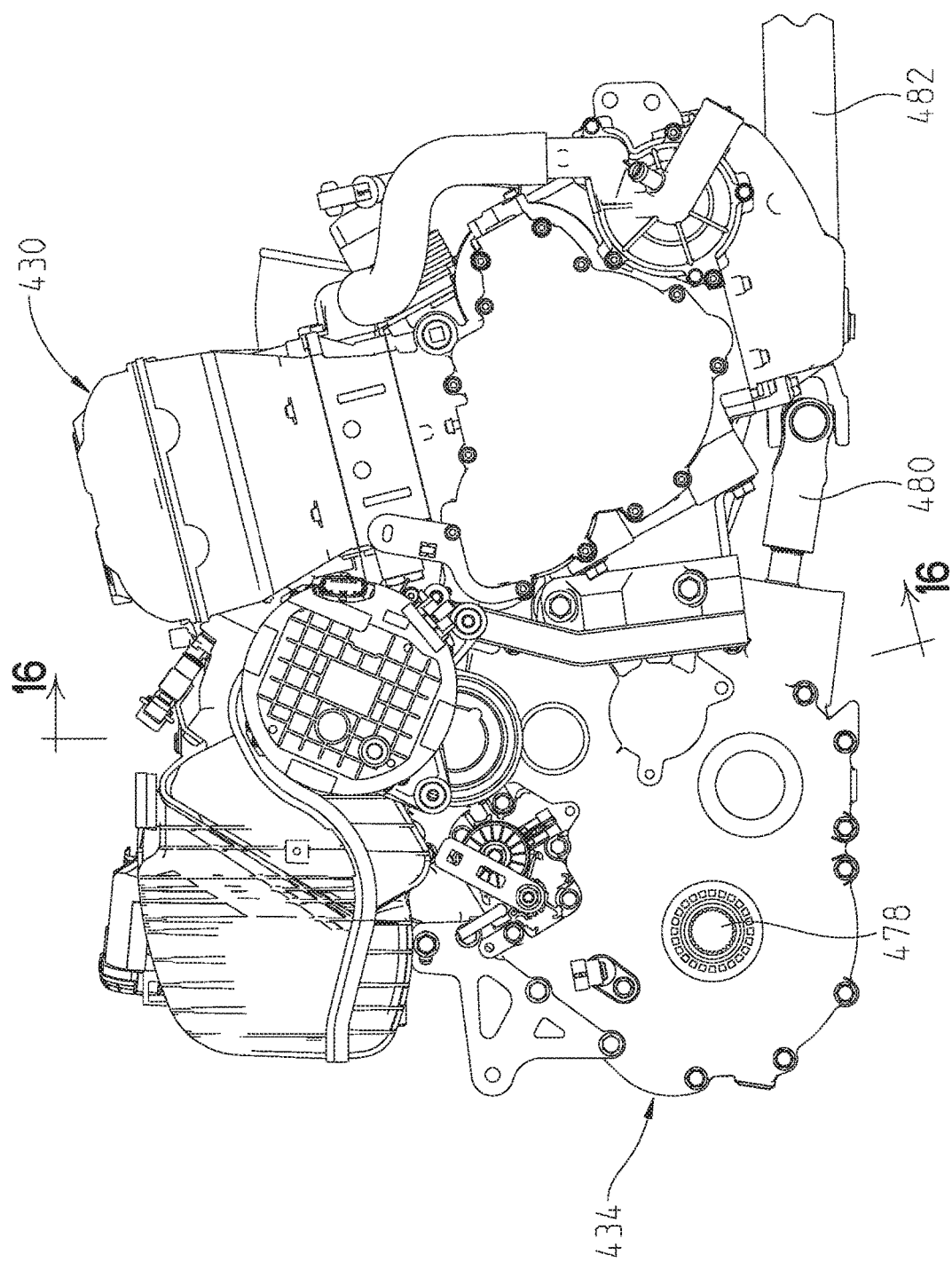
FIG. 13 is a right side view of the drive train of FIG. 11.
Figure 14:
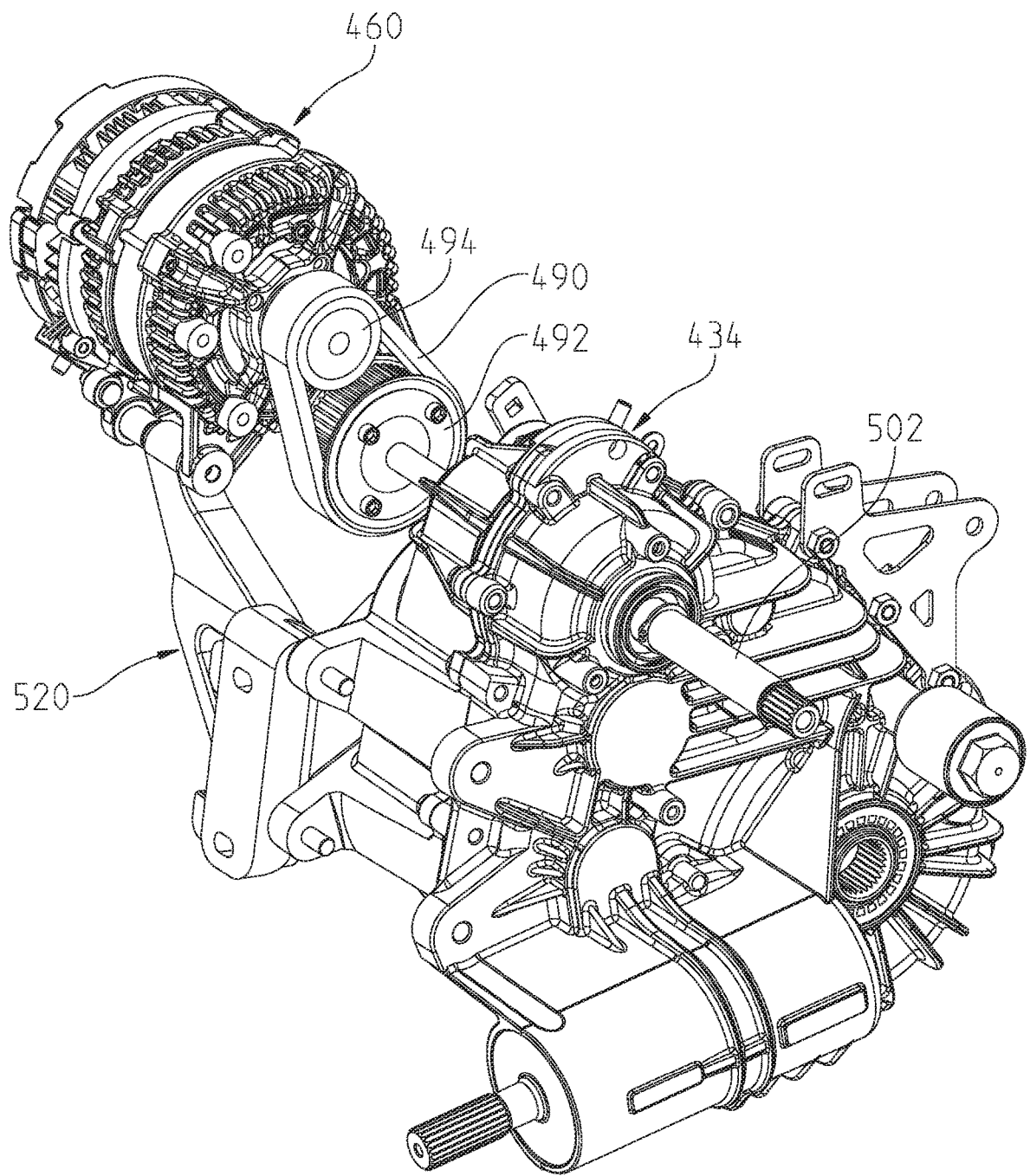
FIG. 14 is a front left perspective view showing the motor coupled to the transmission for the embodiment of FIG. 11.
Figure 15:
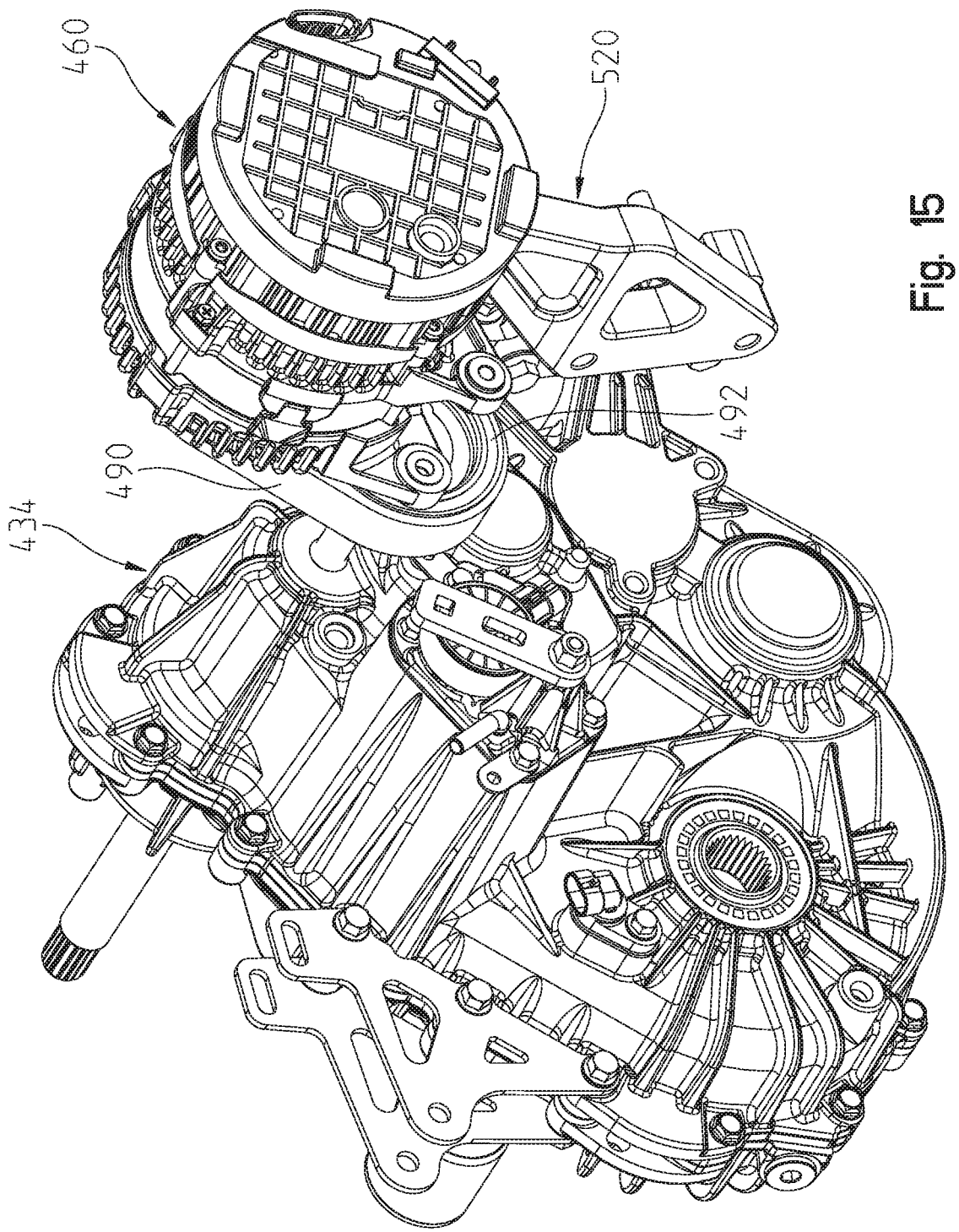
FIG. 15 is a rear right perspective view showing the motor coupled to the transmission for the embodiment of FIG. 11.

With reference now to FIGS. 16-16G, the operation of the hybrid powertrain 416 will be described in greater detail. With reference first to FIG. 16, transmission 434 includes an input shaft 502 which is a solid shaft having gears at 630 and 632. A second shaft 540 is included which includes gears 642 and 644 which mesh with gears 630 and 632 on shaft 502, respectively. Gear 642 may be moved laterally out of meshing engagement with gear 630 by movement in the direction of arrow 648 while gear 644 may be moved into and out of meshing engagement with gear 632 along movement according to arrow 651. Shaft 540 further includes a third gear at 646 which couples with gear 652 on shaft 650. A clutch 620 moves laterally in the direction of arrow 626 which moves gear 652 into and out of meshing engagement with gear 646. Shaft 650 further includes a gear 654 which is in meshing engagement with gear 656. It should be appreciated that gear 656 provides the output to transaxle outputs 478 and 480 (FIG. 13). As with hybrid drive 16, hybrid drive 416 has multiple modes of operation.

With reference first to FIG. 16A, a "charge and drive" mode in high gear is shown where power into shaft 502 from CVT 34 provides power along power path 700 (through shaft 502) to power path 702 (through gears 630, 642) along power path 704 (through shaft 540) to power path 706 (through gears 648, 652) to power path 708 (through shaft 650) to power path 710 (through gears 654, 656). At the same time as shaft is powered by input to shaft 502, a power path 712 is provided which couples to sheave 492 which powers sheave 494 through belt 490. This provides charging of batteries 70 while the motor/generator 460 is in the generator mode. In this mode, gear 644 moves in the direction of arrow 651 to disengage from gear 632.

Figure 16B:
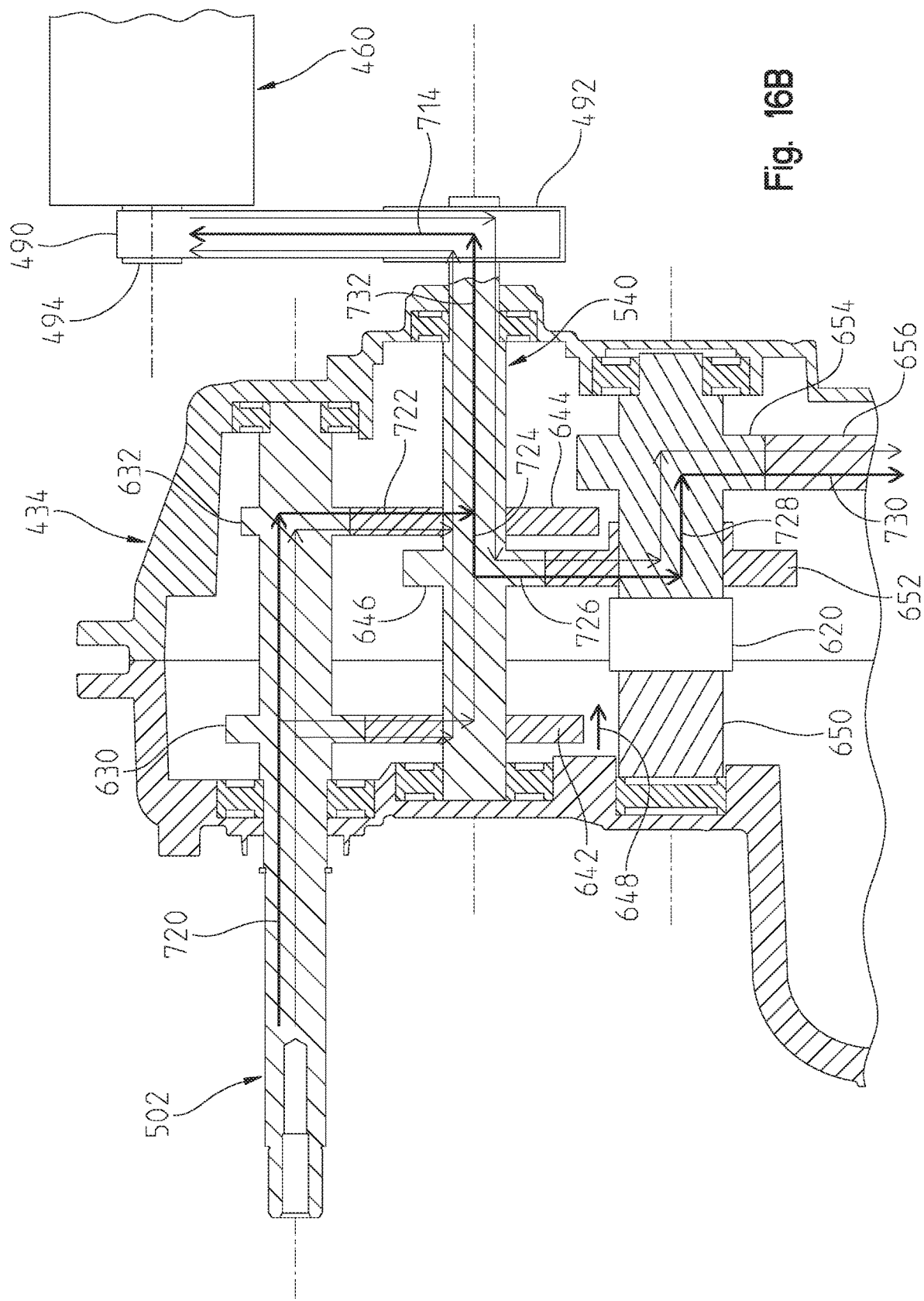
FIG. 16B is a view similar to that of FIG. 16, showing a "Charge-and-Drive" drive mode in low gear.

As shown in FIG. 16B, a "charge and drive" mode can also be utilized in the low gear whereby power from CVT to input shaft 502 provides a power path 720 (through shaft 502) to power path 722 (through gears 632, 644) which provides input to shaft 540 providing a power path 724 (through shaft 540) to power path 726 (through gears 648, 652) to power path 728 (through shaft 650) and then to power path 730 (through gears 654, 656). At the same time power is provided to shaft 540, a power path 732 is provided (through shaft 540) to power path 714 provided by the belt 490 driving sheaves 492 and 494. In this mode, gear 642 moves in the direction of arrow 648 to disengage from gear 630.

Figure 16D:
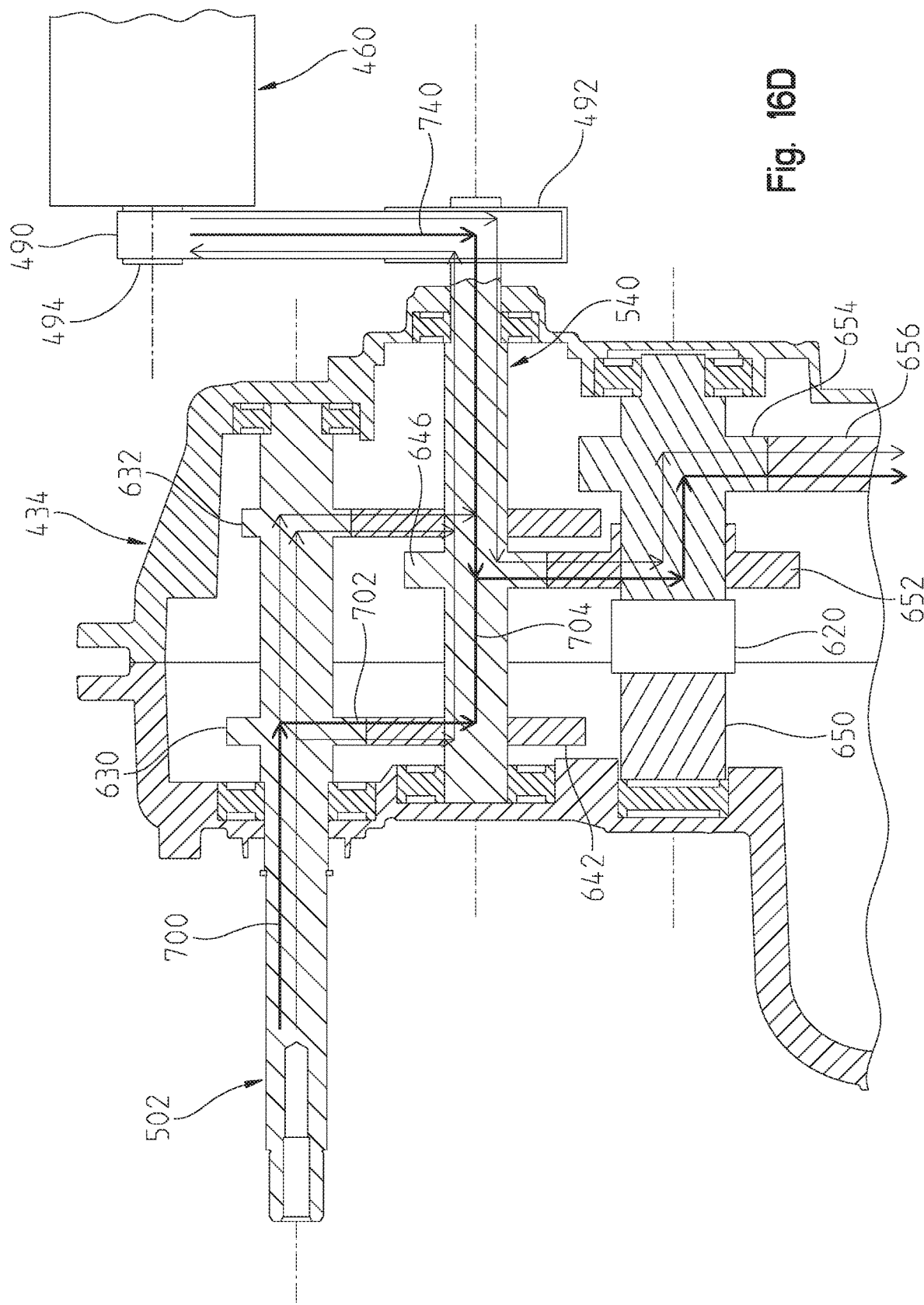
FIG. 16D is a view similar to that of FIG. 16, showing a full performance drive mode with the engine and motor drive in low gear.

With reference now to FIG. 16C, a "full performance" mode is shown in a low gear, which is substantially similar to the embodiment of FIG. 16B, with the exception that power is provided from the motor/generator 460 to shaft 540 through power path 740 such that the motor/generator 460 is operating in the motor mode and assisting in the driving of shaft 540. In a similar manner, and as shown in FIG. 16D, a "full performance" mode is shown in high gear which is substantially similar to that described with respect to FIG. 16A, with the exception that power is provided from motor/generator 460 through power path 740 to drive shaft 540.

Figure 16E:
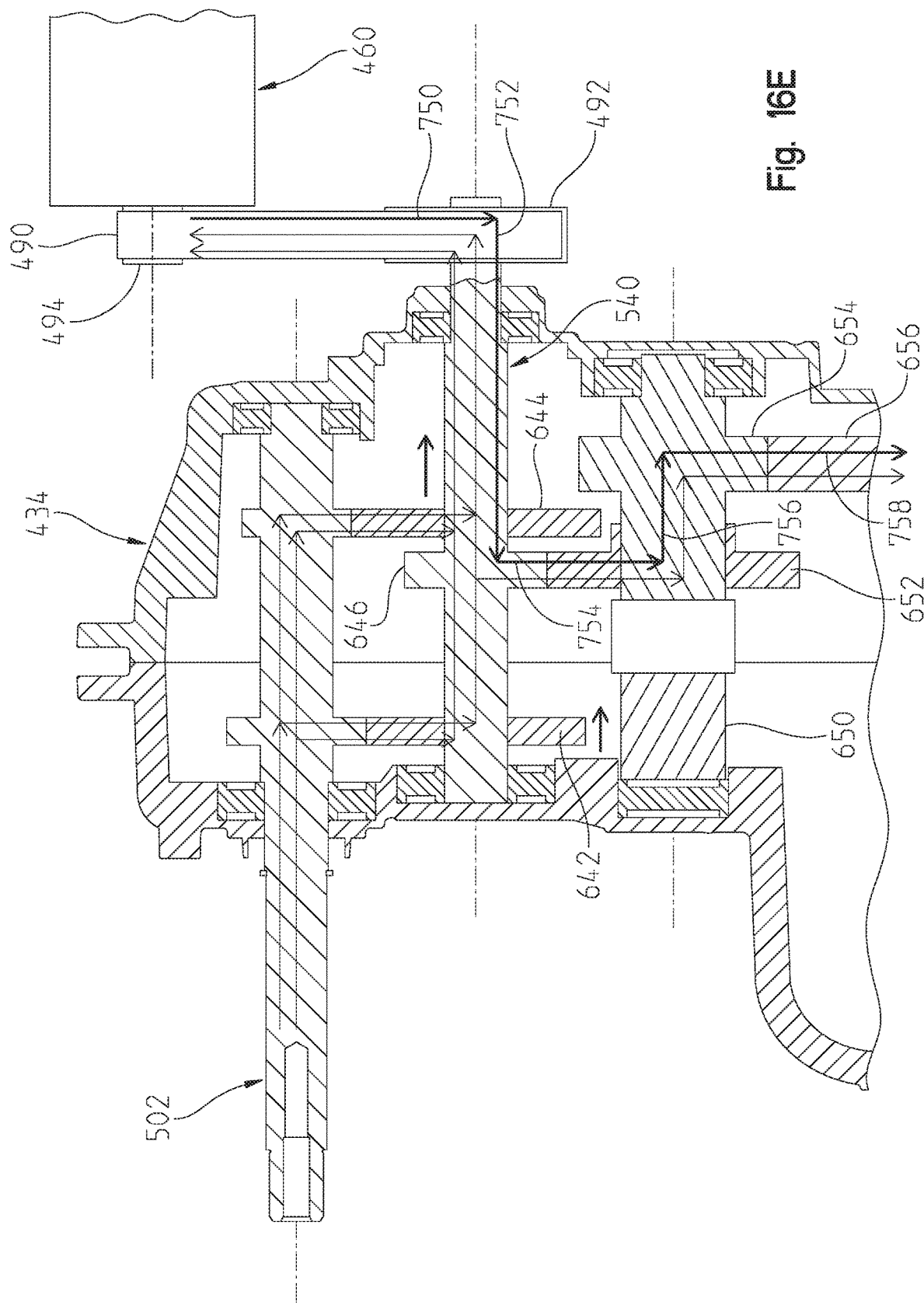
FIG. 16E is a view similar to that of FIG. 16, showing the drive mode with the motor drive only.

An electric only drive mode is shown in FIG. 16E where gears 642 and 644 are disengaged such that power from only motor/generator 460 in the motor mode is driven to shaft 540 through power path 750 to power path 752 (through shaft 540) to power path 754 (through gears 648 and 652) to shaft 650 through power path 756 and to power path 758 (through gears 654, 656).

Finally and with respect to FIG. 16F, a "charge at rest" mode is shown through the low gear such that input from the CVT to shaft 502 provides input to power path 770 (through gears 632, 644) to power path 772 (through shaft 540) and through power path 774 (through belt 490 and sheaves 492, 494). It should be appreciated that clutch 620 in this configuration moves gear 652 in the direction of arrow 626 to take gear 652 out of meshing engagement with gear 648, such that shaft 650 is not rotated. Gear 642 is also disengaged from gear 630 having been moved in the direction of arrow 648.

A similar charge at rest mode is shown in FIG. 16G, through the high gear whereby input power to shaft 502 provides input through power path 780 (through shaft 502) to power path 782 (through gears 630, 642) to power path 784 (through shaft 540) and to power path 786 (through belt 490 and driving sheaves 492, 494). As in the embodiment of FIG. 16, gear 652 is moved by clutch 620 out of meshing engagement with gear 648 by moving gear in the direction of arrow 626. Gear 644 is also disengaged from gear 632 having been moved in the direction of arrow 651.

Finally, a third embodiment of powertrain could be provided where a motor/generator is mounted on the same side as the CVT, where the motor/generator is coupled to the driven CVT pulley. This could be done by a belt and sheaves for example, where one sheave is coupled to the motor/ generator (similar to the embodiment shown in FIG. 14) and the other sheave is coupled to the CVT pulley shaft.

Figure 17:
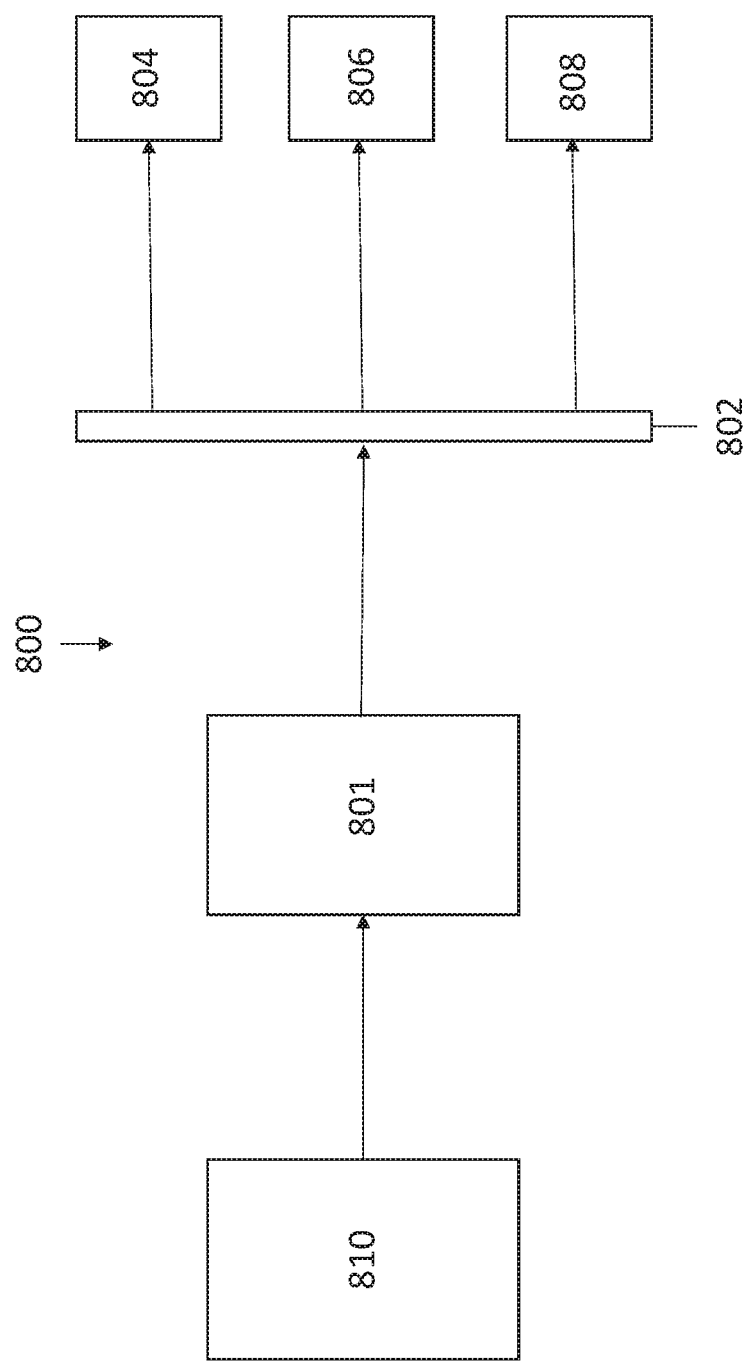
FIG. 17 is a schematic view of a controls system of the vehicle of FIG. 1.

With respect to FIG. 17, a control system 800 of vehicle 10 may be included to control operation of any of the powertrain assemblies disclosed herein. Control system 800 includes a hybrid control unit ("HCU") 801 which is operatively coupled to various control units through a communications network or device, such as a CAN bus 802. For example, HCU 801 may be operatively coupled to an engine control unit ("ECU") 804, a motor control unit ("MCU") 806, and a transmission control unit ("TCU") 808. It may appreciated that ECU 804 may be the same as engine control unit 74 of FIG. 2 and MCU 806 may the same as motor controller 474 of FIG. 12. In this way, various components of the powertrain assemblies disclosed herein may be controlled by individual control units or controllers. However, in other embodiments, the various controllers or control units may be defined as a single controller or control unit but separated by software for individual control of the motor, engine, batteries, and other powertrain components.

Referring still to FIG. 17, HCU 801 is configured to receive inputs or requests from other vehicle components, defined as driver inputs/requests 810. For example, various driver inputs/requests 810 may be provided from the accelerator pedal, the gearbox, and the clutch. In one embodiment, driver inputs/requests 810 may include an input to the accelerator pedal, a requested gearbox position, and a requested driving direction (e.g., forward or reverse).

Control system 800 may be used to provide various modes for operating vehicle 10. In one embodiment, vehicle 10 is configured to operate in a Downhill Speed Control Mode, a Hill Hold Control Mode, a Snow Plow Control Mode, and an Electric Drive-Away Control Mode, as disclosed herein.

Downhill Speed Control Mode

When vehicle 10 operates in the Downhill Speed Control Mode, vehicle 10 is driving downhill and, due to gravity, the velocity of vehicle 10 can increase. Motor/generator 60, 460 may assist with braking vehicle 10 to a specific speed without applying the mechanical brake. More particularly, a negative torque may be applied relative to the direction of driving to maintain a constant velocity of vehicle 10 without the need to apply the mechanical brake when driving downhill. Additionally, when in the Downhill Speed Control Mode, battery 70 may be recharged. For example, motor/generator 60, 460 may be used as a generator to recharge battery 70 when the charge on battery 70 is less than 100%.

Figure 18:
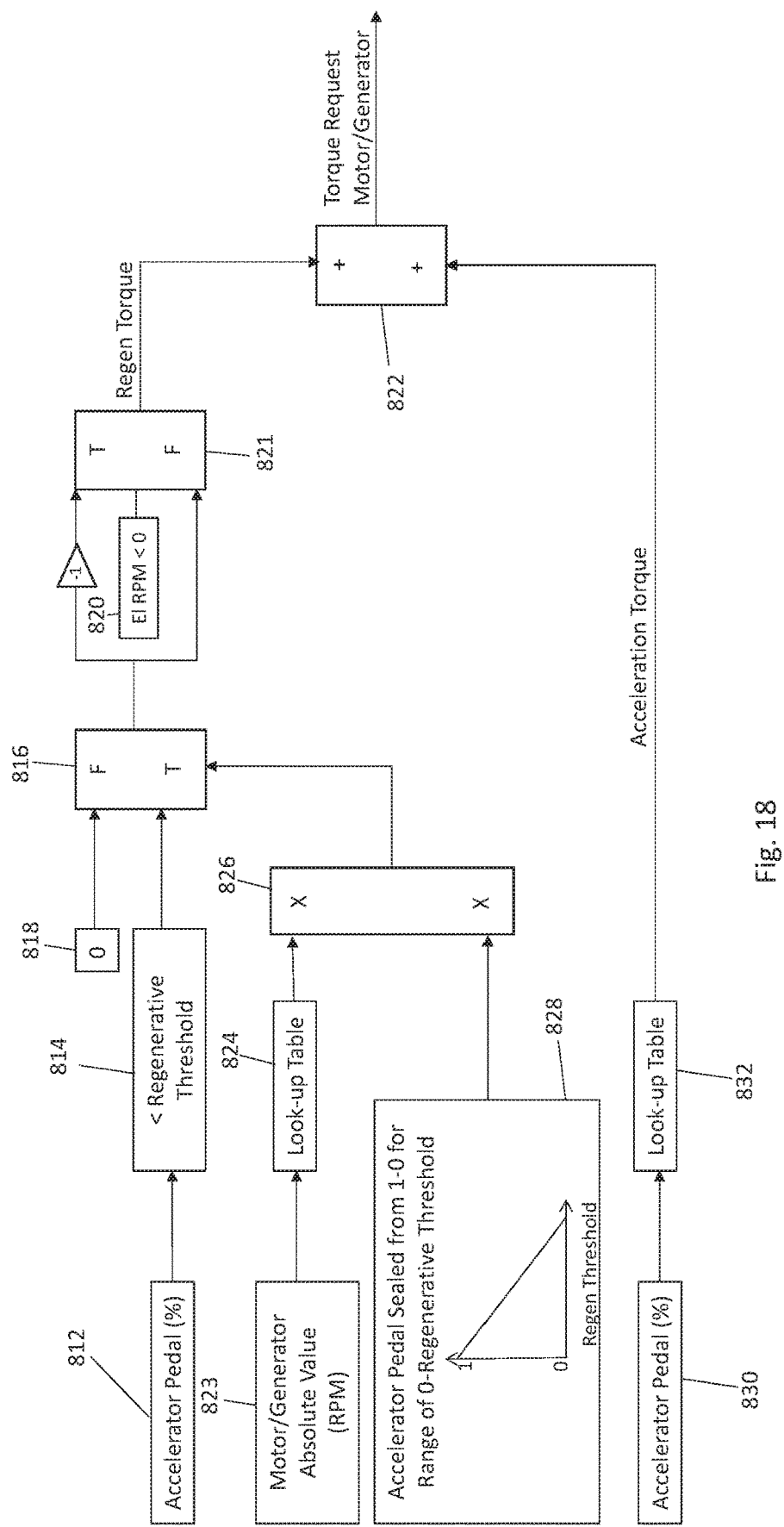
FIG. 18 is a controls diagram of a first drive or control mode for operating the vehicle of FIG. 1.

As shown in FIG. 18, when in the Downhill Speed Control Mode, control system 800 may utilize at least one look-up table to determine the torque requested on motor/generator 60, 460. More particularly, at 812, the accelerator pedal input is determined and compared to the regenerative threshold at 814. The comparison of the accelerator pedal input to the regenerative threshold leads to a true/false path at 816, where a zero input at 818 may be provided or an output from 826 be provided, in order determine the regenerative torque. More particularly, at 816, there is a determination that, if the input is true, then the output is equal to the first output; however, if the determination is false or not true, then the output is equal to the second output. For example, as shown at 820, when the RPM of motor/generator 60, 460 is less than zero, the regenerative torque is determined following 821 and used for generating the torque request on motor/generator 60, 460 at 822. Again, at 821, if the determination of the input is true, then the output is equal to the first output; however, if the determination at 821 is that the input is false or not true, then the output is equal to the second output. As such, if the state-of-charge on the battery is in a predetermined range for regeneration, the accelerator pedal input is below the regenerative threshold, and the RPM of motor/generator 60, 460 is above a threshold, then the braking torque will increase to a maximum value. However, if the RPM of motor/generator 60, 460 decreases to a value below the regenerative threshold, the regenerative torque will be increased to zero to bring vehicle 10 to a smooth stop. In each state, if the accelerator pedal input exceeds the minimum regenerative threshold, vehicle 10 will return an idle state.

Additionally, as shown at 823, the absolute value of motor/generator 60, 460 is used with respect to a look-up table at 824 to determine a signal or input, as shown at 826, in order to arrive at the true/false path at 816. Also, referring still to FIG. 18, at 828 shows that the accelerator pedal is sealed from 1-0 for the range of 0 to the regenerative threshold in order to arrive at the signal(s) or input at 826. In may be appreciated that 826 in both FIGS. 18 and 19 denote a multiplication of the two input signals.

With respect to 830, the accelerator pedal input is compared to a look-up table at 832 to determine the acceleration torque. The acceleration torque is then used to determine the torque requested for motor/generator 60, 460, as shown at 822. It may be appreciated that, outside of the state flow shown in FIG. 18, the regenerative torque will be scaled to the range of the accelerator pedal between zero and a minimum pedal regenerative input to allow the driver to actively control the braking torque over the throttle accelerator pedal. These regenerative controls of vehicle 10 may be used to request a regenerative torque or an acceleration torque from motor/generator 60, 460.

Hill Hold Control Mode

When vehicle 10 operates in the Hill Hold Control Mode, control system 800 prevents vehicle 10 from rolling backwards without applying the brake pedal when stopping on steep grades of terrain. More particularly, motor/generator 60, 460 may be used to fully stop vehicle 10 or allow vehicle 10 to roll backwards at a controlled and slow speed.

Figure 19:
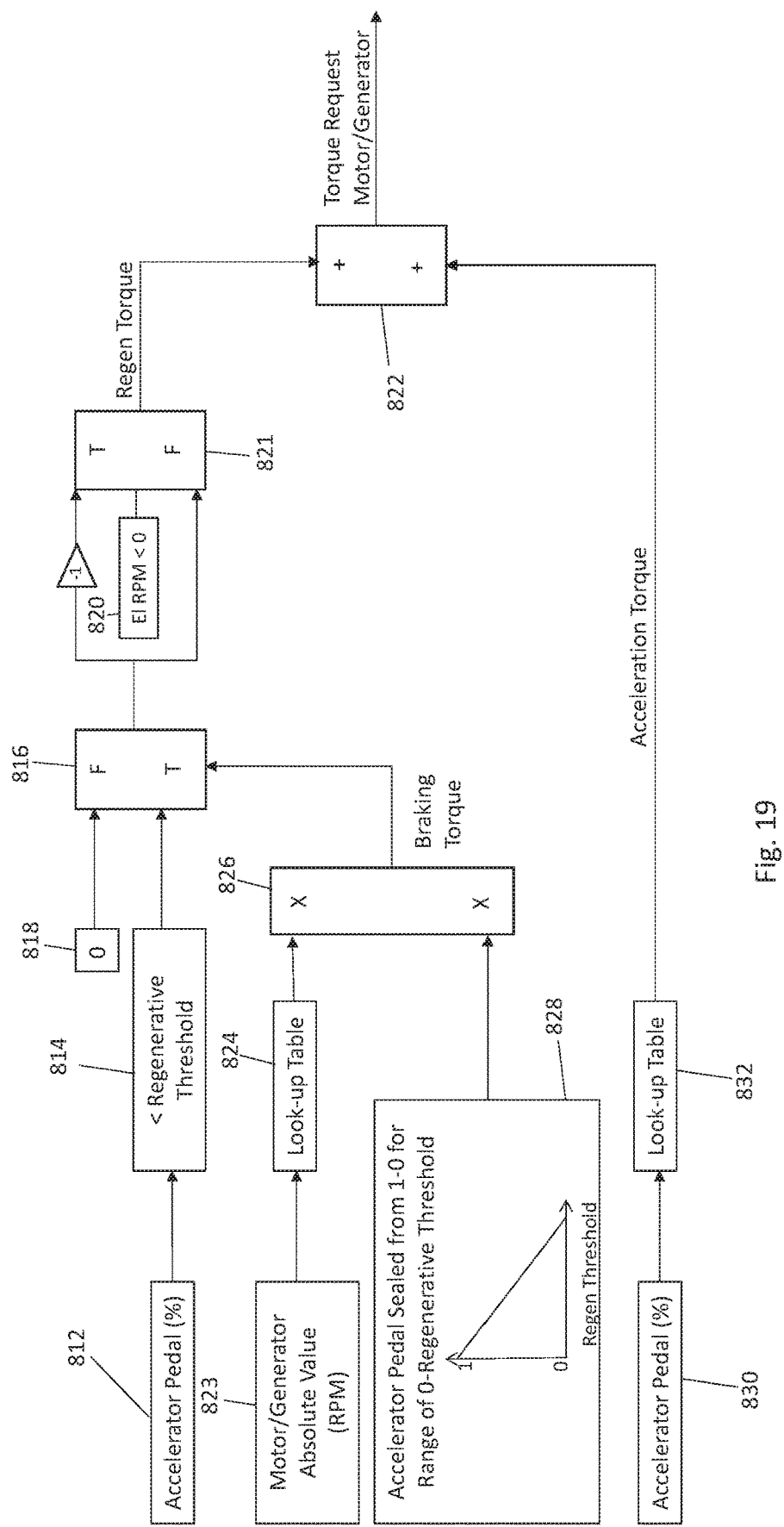
FIG. 19 is a controls diagram of a second drive or control mode for operating the vehicle of FIG. 1.

With respect to FIG. 19, the open-loop, look-up table approach of FIG. 18 also may be used during the Hill Hold Control Mode. If vehicle 10 tends to roll down hill and the accelerator pedal position is zero, then the acceleration torque also will be zero. However, because motor/generator 60, 460 will start to spin, the braking torque, as shown as determined following 826, will increase and slow down vehicle 10.

Snow Plow Control Mode

To perform various tasks, such as plowing snow or allowing for a load at the front end of vehicle 10, the operator desires to have the ability to quickly change between forward and reverse. Additionally, when in the forward mode, vehicle 10 must be capable of pushing or otherwise handling heavy loads. When in the Snow Plow Mode, vehicle 10 is driven forward using engine 30, 430. Engine 30, 430 may be used alone or in combination with motor/generator 60, 460. When vehicle 10 is driven in reverse, only motor/generator 60, 460 is used and engine 30, 430 idles. The driver has the full power and torque available while driving forward and has the option to quickly change to reverse without any mechanical shifting required. More particularly, the transmission position may be in "LOW" in both driving directions, thereby allowing this change in directions to occur without any mechanical shifting. As such, when vehicle 10 is driving in the forward direction, engine 30, 430 provides torque while motor/generator 60, 460 provides a positive torque; however, when vehicle 10 is driving in the reverse direction, engine 30, 430 idles while motor/generator 60, 460 provides negative torque. It may be appreciated that the forward/reverse selection input may be any switch, treadle pedal, or other mechanism which provides an electrical signal or CAN message for the different requested states or driving directions.

Electric Drive-Away Control Mode

To allow for improved low-speed drivability and maneuvering, control system 800 may allow vehicle 10 to be driven in an Electric Drive-Away Control Mode. In this mode, when vehicle 10 is operating as a hybrid vehicle, whereby both engine 30, 430 and motor/generator 60, 460 are used to drive vehicle 10, vehicle 10 may initially start moving using only motor/generator 60, 460 to allow for smooth operation of vehicle 10 at low speeds. When the speed of vehicle 10 increases to a predetermined threshold and the clutch engages such that both motor/generator 60, 460 and engine 30, 430 are used to drive, vehicle 10 then operates at full performance.

Figure 20:
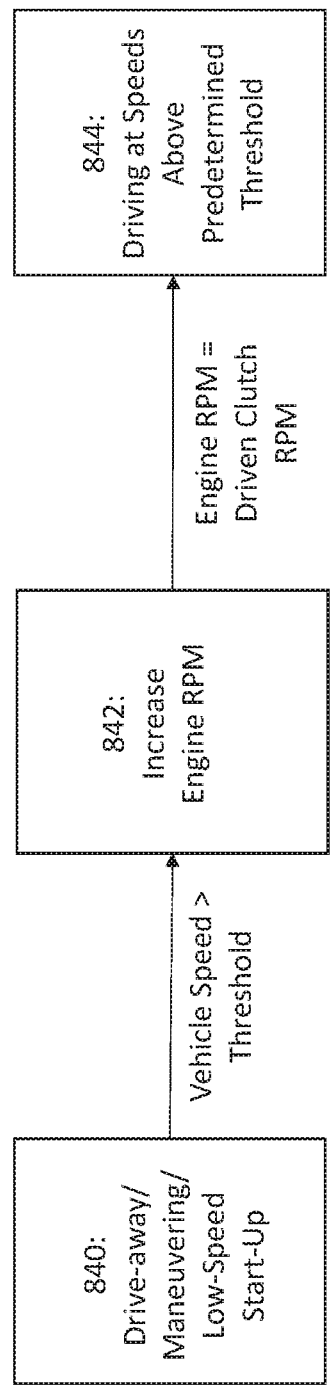
FIG. 20 is a controls diagram of a third drive or control mode for operating the vehicle of FIG. 1.

More particularly, as shown in FIG. 20, when at 840 in a low-speed drive-away/maneuvering operation of vehicle 10, only motor/generator 60, 460 is used and is set to a torque control mode. As the speed of vehicle 10 increases above a predetermined threshold, the speed of engine 30, 430 increases, as shown at 842, and the engine speed may equal the speed of the driven clutch. Specifically, at 842, the speed of the secondary clutch of the CVT is monitored, for example it may be known through the wheel-based speed of motor/generator 60, 460. Engine 30, 430 may be operated in a speed-controlled mode and the speed of engine 30, 430 and the CVT driven clutch may be synchronized. It may be appreciated that motor/generator 60, 460 remains in the torque-control mode at 842. As shown at 844, for normal driving operation of vehicle 10 at speeds above the threshold, engine 30, 430 may be set to the torque-control mode such that both motor/generator 60, 460 and engine 30, 430 are in the torque-control mode.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A parallel hybrid power train for a vehicle, comprising:
    an engine;
    an electric motor/generator;
    a transmission having an input shaft split at a position along a length defining first and second shaft portions, wherein the engine is coupled to an outer end of the first shaft portion and the electric motor/generator is coupled to an outer end of the second shaft portion, at least a second shaft drivingly coupled to the input shaft, the engine and the electric motor/generator being coupled to opposite ends of the transmission input shaft, and the input shaft and the second shaft may be decoupled from each other during operation of the parallel hybrid power train;
    a coupler positioned over an inner end of the first shaft portion and an inner end of the second shaft portion; and
    a final drive assembly operably coupled to the first output, the final drive assembly being provided for driving ground engaging members of a vehicle.

2. The parallel hybrid power train of claim 1, wherein the coupler is movable along the length of the input shaft, wherein, when in a first position, the first and second shaft portions are coupled together, and when in a second position, the first and second shaft portions are decoupled from each other.

3. The parallel hybrid power train of claim 2, wherein when the coupler is in the first position, the engine may drive the input shaft and the electric motor/generator may operate in a motor mode and drive the input shaft.

4. The parallel hybrid power train of claim 2, wherein when the coupler is in the first position, the engine may drive the input shaft and the electric motor/generator in a generator mode.

5. The parallel hybrid power train of claim 2, wherein when the coupler is in the second position, either the engine or electric motor/generator may drive the input shaft.

6. The parallel hybrid power train of claim 1, wherein when the coupler is in the first position, the input and second shafts may be decoupled from each other and the engine may drive the electric motor/generator in a generator mode.

7. The parallel hybrid power train of claim 1, wherein the transmission is a shiftable transmission defined by gears.

8. A parallel hybrid power train for a vehicle, comprising:
    an engine;
    an electric motor/generator;
    a transmission having an input shaft, at least a second shaft drivingly coupled to the input shaft, the engine and the electric motor/generator being coupled to one of the input or second shafts, and at least a first output, and the input shaft and the second shaft may be decoupled from each other during operation of the parallel hybrid power train; and
    a final drive assembly operably coupled to the first output, the final drive assembly being provided for driving ground engaging members of a vehicle,
    wherein the coupling between the input and second shaft is by way of gears.

9. The parallel hybrid power train of claim 8, wherein a first gear is positioned on the first shaft portion and a second gear is positioned on the second shaft portion.

10. The parallel hybrid power train of claim 9, wherein a third gear is positioned on the second shaft and in engagement with the first gear.

11. The parallel hybrid power train of claim 10, wherein a fourth gear is positioned on the second shaft and in engagement with the second gear.

12. The parallel hybrid power train of claim 11, wherein one of the third gear or fourth gear is laterally movable along the second shaft and out of engagement with the first or second gear.

13. A parallel hybrid power train for a vehicle, comprising:
    an engine;
    an electric motor/generator;
    a transmission having an input shaft, at least a second shaft drivingly coupled to the input shaft, the engine and the electric motor/generator being coupled to one of the input or second shafts, and at least a first output, and the input shaft and the second shaft may be decoupled from each other during operation of the parallel hybrid power train, wherein the coupling between the input and second shaft is by way of gears;
    a third shaft coupled to the second shaft; and
    a final drive assembly operably coupled to the first output, the final drive assembly being provided for driving ground engaging members of a vehicle.

14. A parallel hybrid power train for a vehicle, comprising:
an engine;
an electric motor/generator;
a transmission having an input shaft, at least a second shaft drivingly coupled to the input shaft, the engine being coupled to the transmission input shaft and the electric motor/generator being coupled to the second shaft, and at least a first output, and the input shaft and the second shaft may be decoupled from each other during operation of the parallel hybrid power train; and
a final drive assembly operably coupled to the first output, the final drive assembly being provided for driving ground engaging members of a vehicle,
wherein first and second gears are positioned on the input shaft.

15. The parallel hybrid power train of claim 14, wherein third and fourth gears are positioned on the second shaft and in engagement with the first gear and second gears.

16. The parallel hybrid power train of claim 15, wherein one of the third gear or fourth gear is laterally movable along the second shaft and out of engagement with the first or second gear.

17. The parallel hybrid power train of claim 16, further comprising a third shaft coupled to the second shaft.

18. The parallel hybrid power train of claim 17, wherein a fifth gear is positioned on the second shaft and a sixth gear is positioned on the third shaft and the fifth and sixth gears are in meshing engagement.

19. The parallel hybrid power train of claim 18, wherein the sixth gear is laterally movable along the third shaft and into and out engagement with the fifth gear.

20. The parallel hybrid power train of claim 14, wherein the engine drives the input shaft and the electric motor/generator operates in a motor mode and drives the second shaft.

21. The parallel hybrid power train of claim 14, wherein the electric motor/generator operates in a generator mode and the engine drives the input shaft and the electric motor/generator.

22. A parallel hybrid power train of, for a vehicle, comprising:
an engine;
an electric motor/generator;
a transmission having an input shaft, at least a second shaft drivingly coupled to the input shaft, the engine being coupled to the transmission input shaft and the electric motor/generator being coupled to the second shaft, and at least a first output, and the input shaft and the second shaft may be decoupled from each other during operation of the parallel hybrid power train; and
further comprising a third shaft coupled to the second shaft, wherein the second and third shafts may be decoupled from each other;
a final drive assembly operably coupled to the first output, the final drive assembly being provided for driving ground engaging members of a vehicle.

23. The parallel hybrid power train of claim 22, wherein when the input and second shafts are decoupled from each other the engine may drive the electric motor/generator in a generator mode with no power to the first output.

24. A parallel hybrid power train, for a vehicle, comprising:
an engine;
an electric motor/generator;
a transmission having an input shaft, at least a second shaft drivingly coupled to the input shaft, the engine and the electric motor/generator being coupled to one of the input or second shafts, and at least a first output, and the input shaft and the second shaft may be decoupled from each other during operation of the parallel hybrid power train; and
a final drive assembly operably coupled to the first output, the final drive assembly being provided for driving ground engaging members of a vehicle,
wherein the second shaft is axially offset from the input shaft.

25. The parallel hybrid power train of claim 24, wherein the second shaft is unaligned with the input shaft.

26. A parallel hybrid power train for a vehicle, comprising:
an engine;
an electric motor/generator;
a transmission having an input shaft, at least a second shaft drivingly coupled to the input shaft, the engine and the electric motor/generator being coupled to one of the input or second shafts, and at least a first output, and the input shaft and the second shaft may be decoupled from each other during operation of the parallel hybrid power train; and
a final drive assembly operably coupled to the first output, the final drive assembly being provided for driving ground engaging members of a vehicle,
wherein the input shaft extends in an axial direction and a radial direction, and the second shaft is spaced apart from the input shaft in the radial direction and is parallel to the input shaft in the axial direction.

27. A parallel hybrid power train for a vehicle, comprising:
an engine;
an electric motor/generator;
a transmission having an input shaft, at least a second shaft drivingly coupled to the input shaft, the engine and the electric motor/generator being coupled to one of the input or second shafts, and at least a first output;
a final drive assembly operably coupled to the first output, the final drive assembly being provided for driving ground engaging members of a vehicle, wherein the transmission input shaft is split at a position along a length defining first and second shaft portions, and the engine is coupled to an outer end of the first shaft portion and the electric motor/generator is coupled to an outer end of the second shaft portion; and
a coupler positioned over an inner end of the first shaft portion and an inner end of the second shaft portion, wherein the coupler is movable along the length of the input shaft, wherein, when in a first position, the first and second shaft portions are coupled together, and when in a second position, the first and second shaft portions are decoupled from each other.

28. A parallel hybrid power train for a vehicle, comprising:
an engine;
an electric motor/generator;
a transmission having an input shaft, at least a second shaft drivingly coupled to the input shaft, the engine and the electric motor/generator being coupled to one of the input or second shafts, and at least a first output, wherein the transmission input shaft is split at a position along a length defining first and second shaft portions; and
a final drive assembly operably coupled to the first output, the final drive assembly being provided for driving ground engaging members of a vehicle, wherein the coupling between the input and second shaft is by way of gears, and a first gear is positioned on the first shaft portion, a second gear is positioned on the second shaft portion, a third gear is positioned on the second shaft and in engagement with the first gear, a fourth gear is positioned on the second shaft and in engagement with the second gear, and one of the third gear or fourth gear is laterally movable along the second shaft and out of engagement with the first or second gear.

* * * * *